(12) United States Patent
Zhang

(10) Patent No.: US 9,201,927 B1
(45) Date of Patent: Dec. 1, 2015

(54) SYSTEM AND METHODS FOR QUANTITATIVE ASSESSMENT OF INFORMATION IN NATURAL LANGUAGE CONTENTS AND FOR DETERMINING RELEVANCE USING ASSOCIATION DATA

(71) Applicant: Guangsheng Zhang, Palo Alto, CA (US)

(72) Inventor: Guangsheng Zhang, Palo Alto, CA (US)

( * ) Notice: Subject to any disclaimer, the term of this patent is extended or adjusted under 35 U.S.C. 154(b) by 224 days.

(21) Appl. No.: 13/732,374

(22) Filed: Jan. 1, 2013

Related U.S. Application Data

(63) Continuation-in-part of application No. 12/573,134, filed on Oct. 4, 2009, now Pat. No. 8,370,129.

(60) Provisional application No. 61/682,205, filed on Aug. 11, 2012, provisional application No. 61/143,140, filed on Jan. 7, 2009.

(51) Int. Cl.
*G06F 7/00* (2006.01)
*G06F 17/30* (2006.01)

(52) U.S. Cl.
CPC .................................. *G06F 17/3053* (2013.01)

(58) Field of Classification Search
CPC .......... G06F 17/2785; G06F 17/30684; G06F 17/27; G06F 17/30663
USPC ....................................................... 707/730
See application file for complete search history.

(56) References Cited

U.S. PATENT DOCUMENTS

| | | | | |
|---|---|---|---|---|
| 5,151,857 | A * | 9/1992 | Matsui | 704/9 |
| 6,081,774 | A * | 6/2000 | de Hita et al. | 704/9 |
| 6,847,966 | B1 * | 1/2005 | Sommer et al. | 707/739 |
| 6,910,003 | B1 * | 6/2005 | Arnold et al. | 704/4 |
| 6,986,104 | B2 * | 1/2006 | Green et al. | 715/234 |
| 7,263,517 | B2 * | 8/2007 | Sheu et al. | 1/1 |
| 7,409,336 | B2 * | 8/2008 | Pak et al. | 704/9 |
| 8,370,129 | B2 * | 2/2013 | Zhang | 704/9 |
| 2004/0107088 | A1 * | 6/2004 | Budzinski | 704/10 |
| 2006/0053156 | A1 * | 3/2006 | Kaushansky et al. | 707/102 |
| 2014/0114649 | A1 * | 4/2014 | Zuev et al. | 704/9 |

\* cited by examiner

*Primary Examiner* — Binh V Ho

(57) ABSTRACT

System and methods are disclosed for quantitatively assessing information in natural language contents related to an object name, or a concept or topic name, and for determining the relevance between a text content and one or more concepts or topics. The methods include identifying the grammatical or semantic attributes and other contextual information of terms in the text content, and retrieving an object-specific dataset related to the object name, or an equivalent to a concept or a topic name. The data set includes property names and association-strength values. The methods further include matching the terms in the text content with the property terms in the dataset, and calculating a score as a quantitative measure of the relevance between the text content and the concept or topic.

19 Claims, 17 Drawing Sheets

Object name: Computer

| Property Names | Association Strength |
|---|---|
| CPU | 0.99 |
| motherboard | 0.90 |
| memory | 0.95 |
| hard disk | 0.80 |
| operating system | 0.98 |
| speed | 0.60 |
| multi-media | 0.50 |
| case | 0.2 |
| software | 0.7 |
| color | 0.3 |
| UNIX | 0.5 |
| Microsoft | 0.8 |
| …… | …… |

Figure 1

Object or concept name:

Object or concept name:

Computer

| Property Names | Association Strength 1 | Association Strength 2 |
|---|---|---|
| CPU | 0.99 | 0.86 |
| motherboard | 0.90 | 0.95 |
| memory | 0.95 | 0.65 |
| hard disk | 0.80 | 0.50 |
| operating system | 0.98 | 0.98 |
| speed | 0.60 | 0.70 |
| multi-media | 0.50 | 0.40 |
| case | 0.2 | 0.56 |
| software | 0.7 | 0.35 |
| color | 0.3 | 0.2 |
| UNIX | 0.5 | 0.3 |
| Microsoft | 0.8 | 0.6 |
| …… | …… | …… |

Figure 6B

| Terms | Parts of Speech | Grammatical Roles | Semantic Roles | Frequency Count |
|---|---|---|---|---|
| Computer | 0.002 | 0.0003 | 0.05 | 0.0004 |
| CPU | 0.001 | 0.0004 | 0.002 | 0.0002 |
| Memory | 0.004 | 0.0006 | 0.054 | 0.0003 |
| Hard disk | 0.006 | 0.0003 | 0.056 | 0.0004 |
| Software | 0.002 | 0.0003 | 0.058 | 0.0006 |
| …… | | | | |

Figure 10

|  | Computer | USB Drive | Keyboard |
|---|---|---|---|
| computer | 1 | 1 | 1 |
| CPU | 1 | 0 | 0 |
| memory | 1 | 0 | 0 |
| hard disk | 1 | 1 | 0 |
| operating system | 1 | 1 | 1 |
| software | 1 | 1 | 0 |
| …… | …… |  |  |

Figure 13A

|  | Computer | Intel | Microsoft |
|---|---|---|---|
| computer | 1.0 | 0.86 | 0.9 |
| CPU | 0.99 | 0.95 | 0.5 |
| memory | 0.95 | 0.5 | 0.4 |
| hard disk | 0.8 | 0.1 | 0.52 |
| operating system | 0.98 | 0.12 | 0.9 |
| software | 0.7 | 0.2 | 0.98 |
| …… | …… |  |  |

Figure 13B

SYSTEM AND METHODS FOR QUANTITATIVE ASSESSMENT OF INFORMATION IN NATURAL LANGUAGE CONTENTS AND FOR DETERMINING RELEVANCE USING ASSOCIATION DATA

CROSS REFERENCES TO RELATED APPLICATIONS

The present application is a continuation-in-part application of and claims priority to U.S. patent application Ser. No. 12/573,134, entitled "System and Methods for Quantitative Assessment of Information in Natural Language Contents" filed by the present inventor on Oct. 4, 2009. U.S. patent application Ser. No. 12/573,134 further claims priority to Provisional Patent Application 61/143,140, entitled "System and Methods for Quantitative Assessment of Information in Natural Language Contents" filed by the present inventor on Jan. 7, 2009. The present application also claims priority to U.S. Provisional Patent Application 61/682,205 entitled "System and Methods for Determining Term Importance and Relevance Between Text Contents Using Conceptual Association Datasets" filed by the present inventor on Aug. 11, 2012, the disclosures of which are incorporated herein by reference.

BACKGROUND OF THE INVENTION

The present application relates to information management, and more particularly, to technologies for information identification and quantification in natural language contents, and classification, ranking, searching, and retrieval, of such contents, and other functions.

In the information age, more and more individuals and organizations are faced with the problem of information overload. Accurate and efficient methods for information access, including collection, storage, organization, search and retrieval are the key to the success in this information age.

Much of the information is contained in natural language contents, such as text documents. Various theoretical and practical attempts have been made to efficiently organize and determine the relevancy of the information in natural language contents. The existing techniques, including various search engines and document classification systems, however, are often inaccurate in identifying the information focus in the content, and thus often cannot effectively serve the information needs of their users. There is still a need for accurate, efficient, and automated technologies to search, rank, and classify large amounts of natural language contents based on the meaning of the contents, and the amount of information they contain.

SUMMARY OF THE INVENTION

In a general aspect, the present invention relates to a method for quantitatively assessing information in natural language contents.

In another general aspect, the present invention relates to methods for determining relevance between a text content and a concept or a topic. The methods include identifying the grammatical or semantic attributes and other contextual characteristics of terms in the text content, and retrieving an object-specific dataset related to the object name, or an equivalent to a concept or a topic name. The data set includes property names and association-strength values. The methods further include matching the terms in the text content with the property terms in the dataset, and calculating a score as a quantitative measure of the relevance between the text content and the concept or topic.

The methods further include identifying other contextual information of the words or phrases in the text content that match a property term in the association dataset. The methods for identifying the contextual information include identifying positional characteristics of the words or phrases that match a property term in the association dataset, and identifying a sub-segment in the text content that contains at least one word or phrase that match a property term in the dataset, and calculating a relevance score based on the number of sub-segments that contain one or more words or phrases that match a property term.

The methods further include dividing the number of sub-segments that contain a matching term by the total number of sub-segments in the text content. The methods further include first calculating a segment-based relevance score for each segment, and adding the segment-based score to a total score, and dividing the total score by the number of segments in the text content.

The methods further include calculating a term importance score based on the grammatical attributes of the terms in the text content, and based on the internal and external frequency of terms, and then calculating the relevance score based on the term importance score with or without also using the associations strength values associated with the matched property terms in the association dataset.

The methods further include calculating a relevance score between the text content and a conceptual dataset based on whether the matching terms in a sentence form a subject-predicate relationship, or whether the matching terms in a phrase form a modifier-head relationship.

In another general aspect, the present invention relates to a method for finding natural-language documents relevant to a search query.

In another general aspect, the present invention relates to a method for classifying text documents in a natural language.

In another general aspect, the present invention relates to a method for resolving ambiguous word sense or meaning using the context information and conceptual association datasets.

In another general aspect, the present invention relates to a method for detecting user interest or intention by identifying the relevance between a user expression and one or more concepts or topics. The method includes the use of conceptual association datasets.

In yet another general aspect, the present invention relates to a method for providing answers to questions about the topics of a text content. The method uses one or more conceptual association datasets to calculate a relevance score between the text content and one or more concepts or topics.

The systems and methods described in the present application can provide accurate, quantitative, and automated technologies for searching, retrieving, ranking, and classifying natural language contents in such a way that is consistent with the meaning and information carried in the content. The disclosed system and methods are based on a novel theoretical framework, which sets it apart from conventional approaches. The disclosed system and methods can assess information quantity in natural language contents, mainly in the form of text documents that are stored on computer readable media. The disclosed system and methods can produce numerical values specific to each text document as a measurement for the amount of information contained in the document. The disclosed system and methods can also produce quantified measurement for the degree of relevancy of a text content to a given query, a topic, or a concept.

The disclosed system and methods can significantly improve the accuracy and relevancy ranking for information searching and retrieval. The disclosed system and methods can significantly improve the accuracy for document classification. The disclosed system and methods can provide contextual information for word sense or meaning disambiguation in natural language understanding, machine translation, and speech recognition.

Although the invention has been particularly shown and described with reference to multiple embodiments, it will be understood by persons skilled in the relevant art that various changes in form and details can be made therein without departing from the spirit and scope of the invention.

BRIEF DESCRIPTION OF THE DRAWINGS

The following drawings, which are incorporated in and form a part of the specification, illustrate embodiments of the present invention and, together with the description, serve to explain the principles of the invention.

FIG. 1 illustrates an example of an object, its properties and their association strengths associated with the object.

FIGS. 6A and 6B show an example of a one-column and a multiple-column dataset adapted from FIG. 1.

FIG. 10 is an example ETP dataset with hypothetical terms and their corresponding ETP score values.

FIGS. 13A and 13B illustrate the structure of a term-concept or term-topic matrix.

DETAILED DESCRIPTION OF THE INVENTION

Figure 2:
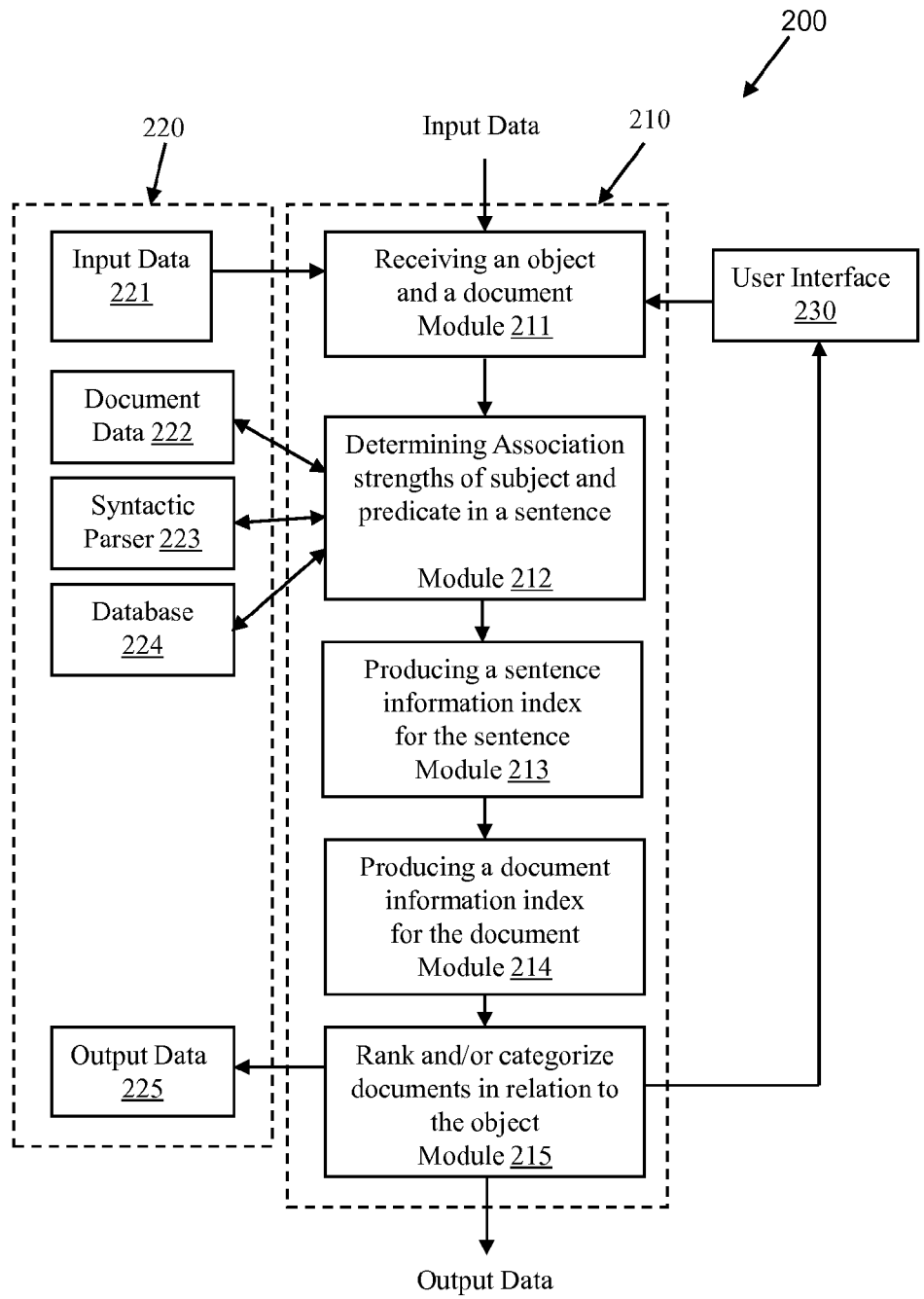
FIG. 2 is an exemplified system diagram in accordance with the present invention.

Human knowledge, or aspects of human knowledge, can be represented in various ways. While internal knowledge representations are functions of human brains, external or artificial representations such as Frame Representation and Semantic Networks are simulation models for certain aspects of such internal knowledge.

The present invention is based on a novel model developed by the present inventor for knowledge and linguistic information representation. The model, called Object Properties Association Model (OPAM), states that part of human knowledge is based on concepts about objects and their associated properties, or based on relationships between different objects. Certain objects are perceived as the properties of other objects. Certain objects are associated with other objects in ways that uniquely define the concepts of such other objects. Simply put, OPAM contends that an object can be uniquely defined by all its associated properties each of which carries a varying amount of information about the object.

As an example, referring to FIG. 1, an object named "computer" is characterized by a plurality of associated properties such as "CPU", "motherboard", "memory", "hard disk", "operating system" . . . that are associated with the object "computer". The prominence of the association between "computer" and each of the properties is characterized by a numerical value herein called association strength. Hypothetical values for the association strengths for "CPU", "motherboard", "memory", "hard disk", "operating system" . . . can, for example, be 0.99, 0.90, 0.95, 0.80, 0.98 . . . , respectively. A higher association strength value can represent a stronger association between the property and the object. The object "computer" can be uniquely defined by the associated properties and their respective association-strength values. Moreover, the association-strength value for a property is specific to the object, and usually varies for different objects. For example, the property "color" may have an association-strength value of 0.8 if the object is "flower", but an association-strength value of 0.2 if the object is "computer".

Conventional knowledge representation models such as the Frame Representation and Semantic Networks focus on the types of relationships between different objects and their derived relationships, such as a tree-like structure of parent-children relationships among different objects. OPAM model of the present invention, in contrast, focuses on what properties are associated with a particular object and their association strength or defining power to the object. OPAM is not focused on the exact types of relationships between the properties and the object.

In OPAM, the object can be a physical object, an abstract object, and can be represented by a symbolic name in a language such as a word, a list of words or a phrase, a character string, a query, a sub-component of a query, a topic, or the name of a document category.

It should be noted that as the present disclosure involves natural languages, and makes references to certain grammatical terms such as a "sentence", and the "subject" and "predicate" of a sentence, and parts of speech of "object", the term "object" used in the present disclosure in the context of the Object Properties Association Model (OPAM) is different from the grammatical term of "object" that refers to the object of a transitive verb, such as a noun or a pronoun, which may be in the accusative case in certain languages, as is used when describing new methods using grammatical analysis with parts of speech. In the context of the Object Properties Association Model (OPAM), the sense of "object" used is a thing or a concept with a name.

Properties of an object can have varying degrees of prominence or association strengths to the object. While the properties are "defining features" of an object, the association strengths in OPAM specify that some properties are more "defining" than others. For example, the object of "computer" is associated with various properties such as having a CPU, memory, a case, a keyboard, as shown in FIG. 1. The property "CPU" having an association-strength of "0.99" is a more defining feature to the object "computer" than the property "case" that has an association-strength value of "0.2".

The OPAM also states that such object-properties relationships are contained in our everyday language. Corresponding to the grammatical structure, there is an information structure in the language we use. Take a simple declarative sentence for example. A simple declarative sentence consists of two parts, the subject and the predicate. In linguistics, a common understanding is that the subject is what the sentence is about, and the predicate tells something about the subject. In the following simple sentences:

1A "John is a student."
1B "John is intelligent."

"John" is the subject of the sentences, while "is a student" and "is intelligent" are respectively the predicates of 1A and 1B.

In OPAM of the present invention, the predicate is interpreted as providing a piece of measurable information about the subject of the sentence. The OPAM model also states that human languages convey information in the basic form of stating that an object has certain properties, or an object is associated with certain other objects as being its properties. The general information structure for a simple declarative sentence is "Object O has or is associated with Property P", or O+P, corresponding to the grammatical structure of "Subject+Predicate".

In the present disclosure, the use of "simple sentence" and "simple declarative sentence" is interchangeable.

The simple sentence 1A is a statement about two objects of "John" and "student". In a conventional understanding, the speaker is telling something about John (that he is a student). In a mathematical or logical interpretation, the object "John" is declared to be a member of the object class of students. In OPAM of the present invention, the object "John" is said to have or to be associated with a property of "being a student". The speaker is providing a piece of information about the object of "John". The simple sentence 1B associates another property with the object of "John" (that he is intelligent), thus providing another piece of information about the object of "John".

The same information structure in the simple sentences can also hold in complex sentences, as well as the grammatically distinguished compound sentences. A complex sentence is a sentence that contains other (embedded) sentences or clauses as its components. For example, in the complex sentence "I know that you are intelligent", the predicate "know that you are intelligent" contains another sentence of "you are intelligent", which has its own subject ("you" in this case) and predicate ("are intelligent"). Complex sentences, and simple sentences contained in them, can be recursively reduced to the atomic Subject+Predicate structure.

In conventional grammar, a compound sentence is a sentence that contains two or more independent clauses, or non-embedded clauses, such as "John is a student, and Mary is a teacher." in which the two clauses do not contain each other. In the present disclosure, the term "complex sentence" refers to both the complex sentence and the compound sentence.

A document can include one or more paragraphs. Each paragraph can include one or more simple and/or complex sentences.

Given the information structure of a simple sentence as being "Object O is associated with Property P", the amount of information a linguistic content may carry also depends on which of the properties of the object is being associated with the object. Compare the following:

2A. "A computer has a CPU."
2B. "A computer has a case."

Sentences 2A and 2B may not convey new information about the object of computer to someone having basic knowledge about computers. When asked: "Which of the sentences is more informative about the object of computer?" however, the same person would very likely choose 2A as the more informative one. This example shows that for the same object and to the same receiver of a message, different properties carry different amounts of information about the object. In this example, "CPU" is a more defining feature than "case" for the object "computer".

The sentence "A computer has a CPU and a hard disk." contains more information about the object "computer" than the sentence 2A. A document consists of two sentences such as "A computer has a CPU. And it also has a hard disk." contains more information about the object of "computer" than a document that consists of only one single sentence such as "A computer has a CPU." This is the cumulative or incremental nature of the amount of information in a linguistic content.

In the presently disclosed system and methods, the information contained in a text document about an object is quantitatively assessed by analyzing sentences in the document. Each sentence can carry different amount of information about a specific object.

As is shown above, judgment of the amount of information in a document can be subjective, or the measurement can be relative, depending on one's prior knowledge. In the presently disclosed system and methods, it is not required for the assessing system to have prior knowledge about the object. In some embodiments, the disclosed system and methods can assume an initial knowledge in the assessing system as a relative standard. In some other embodiments, in order to establish an absolute or objective standard for measuring the quantity of the information in a linguistic content, such initial knowledge is set to zero. Thus, in the example of a simple sentence, such as "Object O has property P", anything that can be a property of the object, or that can appear in the position of P is assumed to carry potential information of certain amount about the object O.

Referring to FIG. 2, a system 200 for quantitatively assessing information in natural language contents includes a computer processing system 210, a computer storage system 220, and a user interface 230. The computer processing system 210 includes algorithmic applications that further include functional modules 211-215 for conducting quantitative assessment of information in natural language contents. The computer processing system 210 can be implemented as, but not limited to, a central processing unit, an application-specific computer processor, a network server, and a group of computer processors. The computer processing system 210 can be implemented on a device that has computation power, for example, a personal computer, a portable computer, a mobile device such as a smart phone or a personal digital assistant, a computer network system comprising servers and processors that can provide information service to a remote server or client machine, and a cloud computing system. The computer storage system 220 can store, as described in more detail below, input data 221, document data 222 comprising one or more documents, optionally a syntactic parser 223, a database 224, and output data 225. The computer storage system 220 can be implemented in many types of storage media based on magnetic, optical, and mechanical properties, and nano materials, which can include a hard drive and an array of hard drives, flash memory, optical disks, and magnetic tapes. The user interface 230 can be provided, for example, by a program installed on a computer, a web browser, and an application for mobile devices.

The module 211 in the computer processing system 210 receives input data from an external source, input data 221 in the computer storage system 220, or input data from the user interface 230. The input source can include a query from a web browser, a search text string entered by a user at a user interface (e.g. 230). The input data includes an object name and a document. The object name can be in the form of a word, a list of words or a phrase, a character string, a sub-component of such string. The object can be a physical object or an abstract object. The object name can be obtained from the input string, which can be or can contain a query, a topic, or the name of a document category. The document can include any document that includes text in a language, such as a web page, a menu, a book, an email, a text message, an article, a dictionary, an instruction manual, etc. The module 211 can first receive a path to one or more documents, and subsequently retrieves the one or more documents according to the path. The document(s) can be stored in document data 222 in the computer storage system 220.

The computer storage system 220 can optionally include a syntactic parser 223. A syntactic parser is in most cases a rule-based procedure, mostly embodied in the form of a computer program. It receives a string of characters, such as a sentence or an equivalent, and outputs a structural description of the grammatical relations between various components of the sentence. Syntactic parsers of various types can be freely or commercially available, or can be constructed based on rules one wishes to employ. The syntactic parser 223 can be used to divide a simple sentence into a subject and a predicate. As it is known, a syntactic parser may not always produce a structural description of a sentence that conforms to the understanding by human language users. In some cases, a syntactic parser may fail to produce a meaningful description. Alternative approaches to the syntactic parser 223 are disclosed below to address such extreme cases.

In the present disclosure, the subject or the predicate in a sentence can be in the form of a single word, a string of words or a phrase, or an embedded clause.

The database 224 in the computer storage system 220 stores names of a plurality of objects, the names of the properties for each object, and association-strength values of each property for an object. The object names, the property names, and the association-strength values can be stored in a table form, as shown in FIG. 1, or in other data structures. In the present invention, the association strength of a property to a given object is a measure for the amount of information that the property potentially carries for the object. The amount of information that is actually realized, to be discussed in detail below, can depend on the context in which the property term occurs. The above described database can be called a Knowledge Base because it stores knowledge about associations among objects and properties. The database 224 can be constructed automatically, semi-automatically, and/or by manual input. As discussed previously, the association strength for a property is dependent on the object of interest, thus the association strength can also be referred to as Object-Dependent Association Strength.

Figure 3:
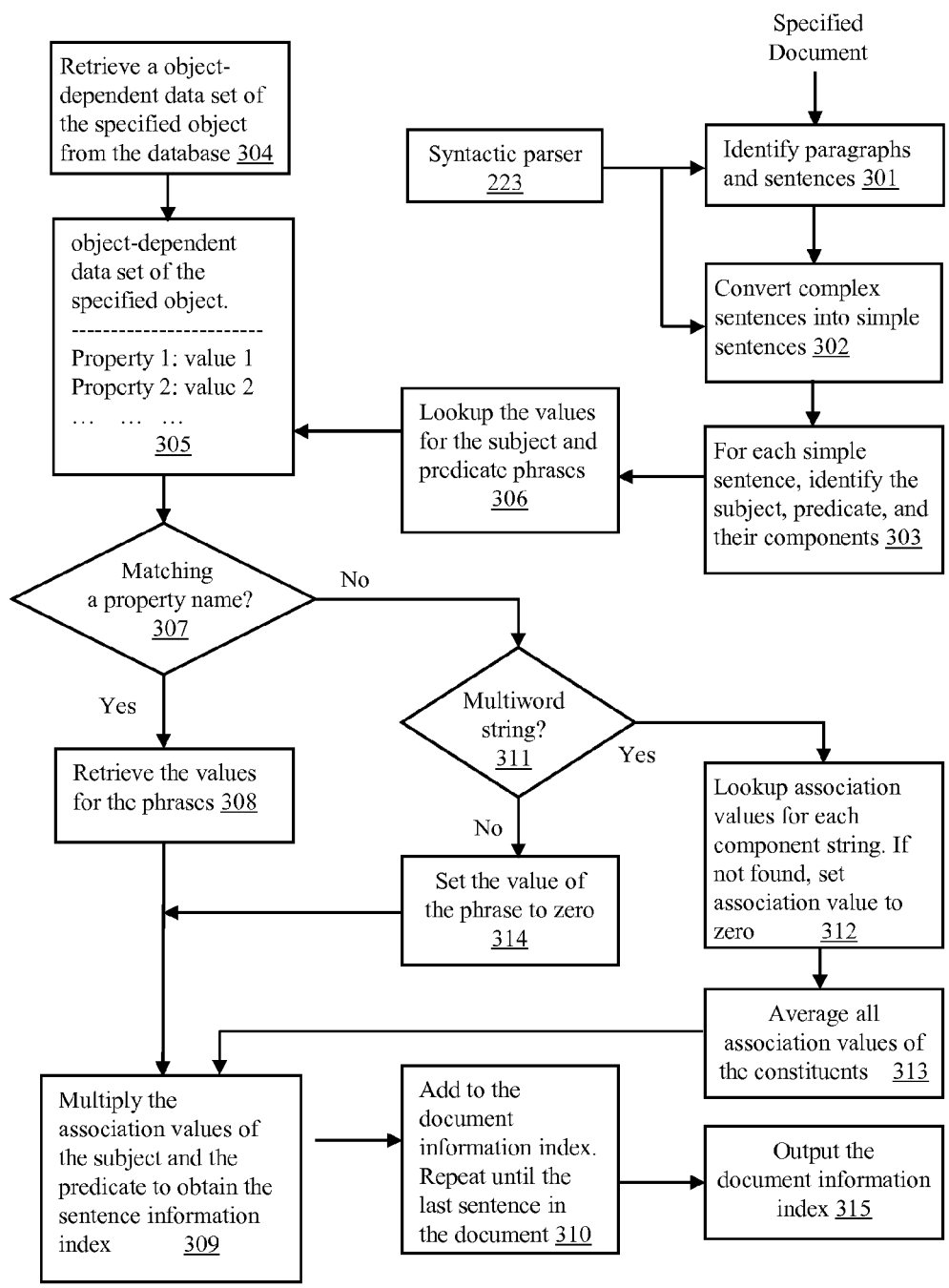
FIG. 3 illustrates detailed steps for quantitatively assessing information in the specified document for the specified object in FIG. 2.

FIG. 3 illustrates detailed steps conducted by the modules 212-214 in FIG. 2. The syntactic parser 223 is applied by the module 212 to parse the specified document to produce a list of paragraphs and sentences (step 301). Complex sentences in the specified document, if any, are next converted into simple sentences as described above (step 302). For each simple sentence, the module 212 identifies a subject and a predicate and returns two labeled text strings: a subject string and a predicate string (step 303). On the other hand, the module 212 retrieves an object-specific data set associated with the specified object name from the database 224 (step 304). The object-specific data set (305) includes a plurality of properties and corresponding association-strength values specific to the object. Next, the subject and the predicate obtained in step 303 are searched against the property names in the object-specific data set to determine if a property name in the object-specific data set matches the subject or the predicate of the sentence (step 306). If such a match is found for the subject or the predicate (step 307), the association-strength value for the subject or the predicate in the sentence is retrieved from the object-specific data set (step 308). The association-strength values of the subject and the predicate of the sentence are then multiplied to obtain a sentence information index by the module 213 in FIG. 2 (step 309). The sentence information index obtained in step 309 is added to a document information index by the module 214 in FIG. 2 (step 310).

As is described above, the association strength values of the subject and the predicate reflect the potential information they carry about the specific object. The mathematical operation of multiplying the two values together in step 309, in the present invention, is one of the means of realizing such information potentials in the context of a subject and a predicate. In addition, the mathematical operation of adding the sentence information index to produce a document information index (step 310) is one of the means of integrating the cumulative or incremental nature of the amount of information in a linguistic content as described earlier.

If no property name in the object-specific data set for the object name is found to match the subject or the predicate string of the sentence (step 307), the non-matching phrase string is analyzed to see if it is a multiword string (step 311). If the non-matching phrase string is a multiword string, the association strength of each of its components or sub-strings is looked up from the object-specific data set (step 312). If a match for a sub-string is found, the association-strength value for that sub-string is retrieved from the data set (step 312). If a match for a sub-string is not found, the association-strength value for that sub-string is set to zero (also in step 312). The association strength of the multiword phrase string can be derived by averaging the association-strength values of all the sub-strings (step 313), or by further analyzing the internal structure of the phrase using a syntactic parser (steps 420 to 470). The derived association-strength value of the multiword phrase string is used to calculate the sentence information index (step 309). If the subject or the predicate phrase string is not a multiword string (step 311), the value of the phrase is set to zero (step 314), which will produce a zero-valued sentence information index (step 309).

The steps 306-309 and 311-314 are repeated to the next sentence in the document until all the sentences in the document are analyzed (step 310). As described above, the amount of information in a linguistic content is cumulative or incremental in nature. The final document information index is a sum of the sentence information index in the document, and is output by the module 214 to the module 215 as illustrated in FIG. 2 (step 315).

In some embodiments, the sentence information index can be obtained by using different formulae than the simple multiplication of the association-strength values of the subject and predicate of a sentence. For example, different coefficient values can be used for the subject and the predicate, respectively, when the two association strength values are multiplied, reflecting the weight difference in the subject position and the predicate position. The document information index also may not be a linear sum of the sentence information indices of the sentences in the document. The document information index can be non-linearly dependent on either the sentence information indices or the paragraph information indices which can in turn be non-linearly dependent on the sentence information indices in the document.

As is described earlier, a complex sentence is a sentence that contains other sentences or clauses as its components, and each such component clause can eventually be reduced to and expressed in the form of a simple sentence of Subject+Predicate. Thus, the information structure of Object+Predicate (O+P) of a simple sentence can also hold for the lower level clauses in a complex sentence, and the above described methods for simple sentences can be recursively applied to the components of a complex sentence, and the information index of a complex sentence can be produced by summing up the information indices of its component sentences, or by alternative formulae as described above.

A phrase in a language can be a simple phrase, such as a single word, or a complex phrase of multiple words. In linguistics, a complex phrase is usually a phrase consisting of a head and one or more modifiers of the head. For example, in the complex phrase of "digital cameras", the word "camera" is the head, and "digital" is a modifier. In the OPAM model of the present disclosure, the head is treated as the name of an object (or a class of similar objects), and a modifier is treated as the name of a property of the object or class. The complex phrase of "digital cameras" is the name of a subclass of cameras that all have the property of being digital in nature, and has the information structure of "an object (class) O that has the property of P. A head can be a multiword phrase, such as "New York", and a modifier can also be a multiword phrase, such as "North West" in a complex phrase of "North West New York". With the information structure of a complex phrase also being O+P, the above described methods for calculating the information index for a simple sentence can also be recursively applied to a complex phrase to produce the information index of the phrase by retrieving from the object-specific data set the respective association strength values for the head and the modifier, and then multiplying the two values, optionally with an coefficient as an adjustment for complex phrases as incomplete sentences.

A simple sentence with complex phrases as both its subject and predicate may have the information structure of "The object O that has property P has the property PP that has the property PPP", where the information structure of the subject of the sentence is "The object O that has property P", and the information structure of the predicate of the sentence is "has the property PP that has the property PPP".

Figure 4:
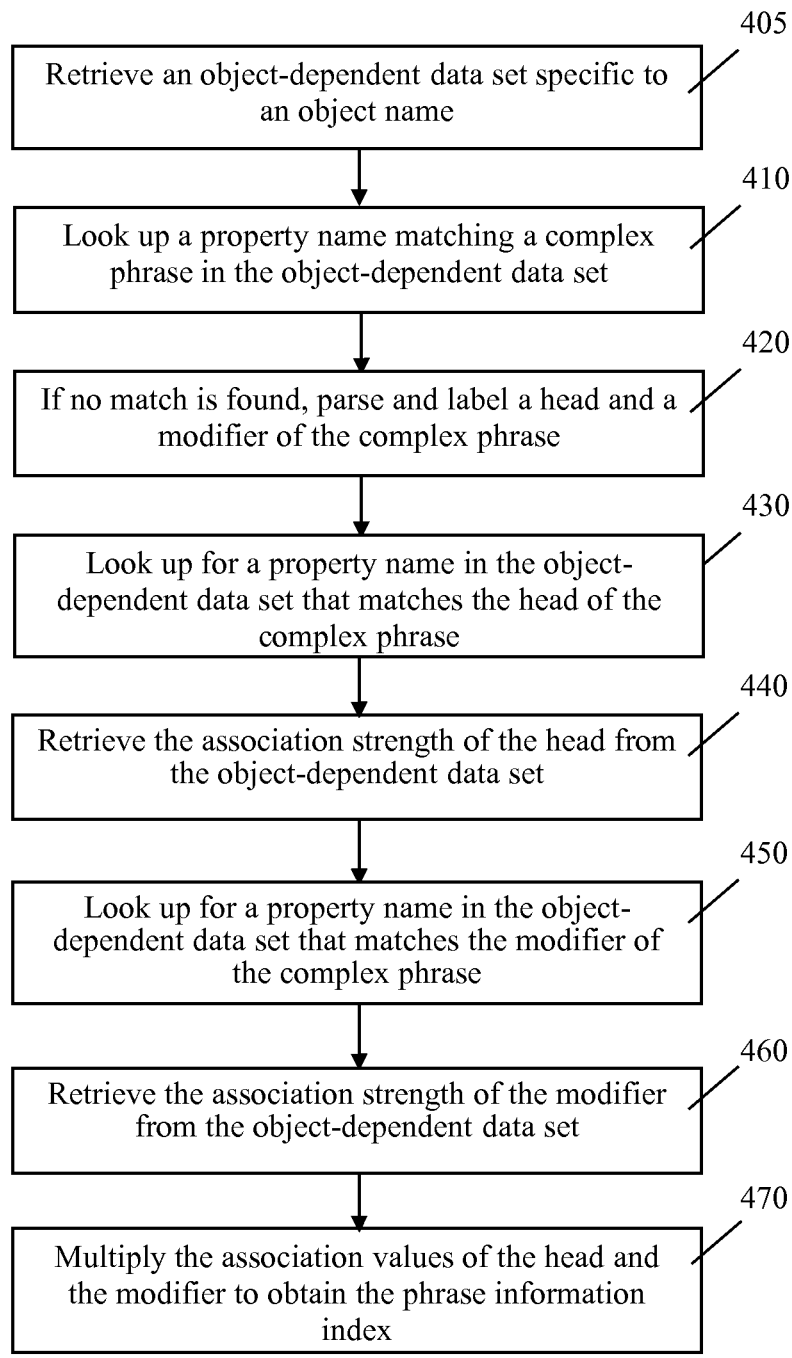
FIG. 4 illustrates another exemplified method for quantitatively assessing information in phrases and sentences.

In some embodiments, referring to FIG. 4, complex phrases in a simple sentence can be analyzed using steps shown in FIG. 4 as an alternative to steps 311 to 313 in FIG. 3. An object name is determined and an object-dependent data set specific to the object name is retrieved (step 405). The object-specific data set, as described above, is specifically related to the object name. A property name is looked up in the object-specific data set for the complex phrase (e.g. "digital camera") (step 410). If a match is found, the complex phrase can be treated as a simple property name as discussed in steps 305-315. If no match is found, the complex phrase is parsed to a head (e.g. "camera") and a modifier (e.g. "digital") (step 420). Next, a property name is looked up in the object-specific data set that matches the name of the head of the complex phrase (step 430). The association-strength value for the head is retrieved from the object-specific data set (step 440). A property name is looked up in the object-specific data set that matches the name of the modifier of the complex phrase (step 450). The association-strength value of the modifier is then retrieved from the object-specific data set (step 460). The association-strength values of the head and the modifier are multiplied to produce the phrase information index (step 470), which can be a quantitative measurement of the amount of information contained in the phrase about the specific object, and which can also subsequently be used as the derived association strength of the phrase to the specific object to calculate the sentence information index, and then the document information index.

If the head or the modifier of a complex phrase does not find a match in the object-specific data set, and the head or the modifier is a multiword phrase, the parser can continue to analyze the components of the multiword phrases, and recursively apply the above method. However, the presently disclosed system and methods also provide alternative embodiments as described below.

The accuracy of syntactic parsers in general tends to decrease and the computation intensity tends to increase as the complexity of the sentence structure increases. In some cases, a syntactic parser can fail to produce a correct structural description of a complex phrase or a complex sentence. To handle these situations, the presently disclosed system and methods provide an alternative to the above described parser-based recursive structural analysis of complex sentences and complex phrases (as shown in steps 302 and 303 in FIG. 3, and 420 to 470 in FIG. 4). The alternative approach derives the association-strength value of a complex subject or predicate phrase by averaging the association-strength values of its component terms when an exact match of the complex phrase is not found in the database (shown in steps 311 to 314 in FIG. 3). In other words, instead of recursively applying the syntactic parser to label the internal structure of the two phrases, components in the subject and predicate phrases can be looked up in the object-specific data set without applying the syntactic parser to label the head and the modifier of the phrase. If the association-strength values of the components are found in the object-specific data set, then the average of the association-strength values is used as the derived association strength for the subject or the predicate phrase.

For example, in response to an object name "computer" in a query, a syntactic parser returns the subject of a sentence as "The computer with 4 GB of memory" and the predicate of the sentence as "has a Unix operating system." A search in the object-specific data set for the object "computer" does not result in a match for either of the complex phrases. Instead of recursively applying a syntactic parser to identify the head and the modifier in the phrase, with the alternative approach, each word or combinations of words in the subject phrase "The computer with 4 GB of memory" are looked up for their corresponding association-strength values from the object-specific data set for the object "computer". The association-strength values for the seven component terms or for combinations of such component terms are averaged to produce the derived association-strength value for the subject phrase.

Figure 5:
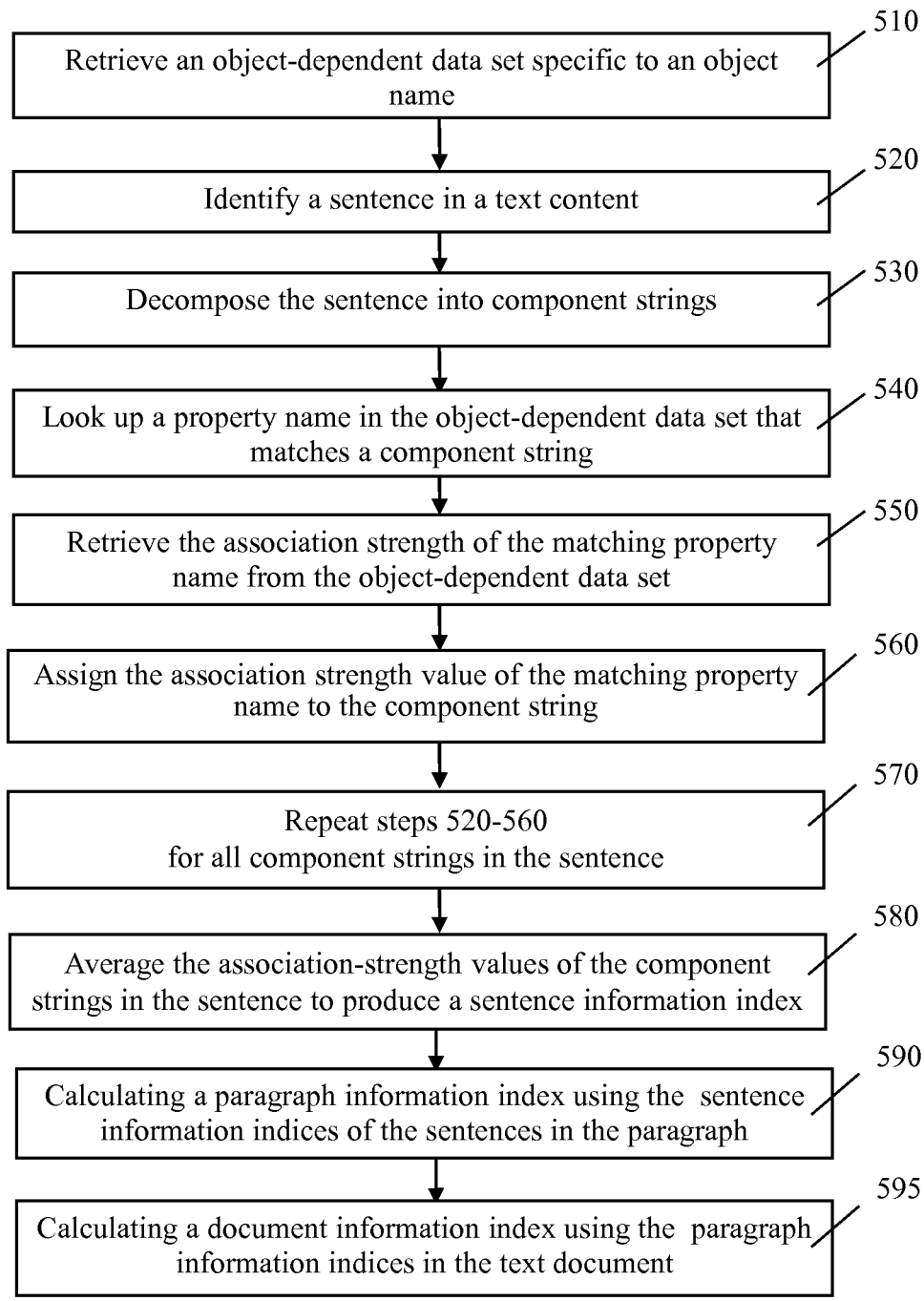
FIG. 5 illustrates another exemplified method for quantitatively assessing information in a text content.

In some embodiments, the disclosed system and methods do not employ a syntactic parser. In this case, the subject and the predicate are not required to be identified in a sentence. Referring to FIG. 5, an object name is determined and an object-dependent data set specific to an object name is retrieved (step 510). A sentence is identified by appropriate punctuation marks of a text document in a natural language (step 520). A sentence is treated as a text string. The text string is decomposed into component strings (step 530). A component string can include a single word, a phrase, or combinations of word sequences of different lengths. For each such component string in the sentence, a property name matching component string is looked up in the object-specific data set (step 540). If a match is found, the association-strength value for the property name matching the component string is retrieved from the object-specific data set (step 550). The association strength value for the matching property name is assigned to the component string (step 560). Steps 530-560 are repeated for all component strings in the sentence (step 570). The association-strength values of such component strings in the sentence are averaged to produce a sentence information index for the sentence (step 580). Various coefficients, such as the relative positions of component strings in the sentence, can be used as the component string's weight to produce a weighted average. For each sentence in a paragraph, the sentence information index of the sentence is added up to produce a paragraph information index for the paragraph (step 590). The paragraph information indices of the paragraphs in the text document are added up to produce a document information index of the document (step 595). In some cases, the document information index can be calculated directly using the sentence information indices of the sentences in the text document.

In some embodiments when a syntactic parser is not used, the disclosed system and methods do not require a sentence to be identified by punctuation marks. The entire document or a paragraph is treated as a flat text string. The text string is broken down into component strings such as words and phrases, including combinations of word sequences of different lengths. Each such component string in the document or a paragraph is looked up in the object-specific data set. The corresponding association-strength values are retrieved. In addition to using a simple average of all the association-strength values of such component strings in the document or a paragraph as their respective information index, various coefficients, such as the frequency a component string occurs in the document or a paragraph, and/or the relative positions of component strings in the document, can be used as the component string's weight to produce a weighted average as the information index of the document or a paragraph. If a user prefers, paragraphs can be used as the text unit for information measurement; and the information index of each paragraph can be added up to produce the information index of the document. In certain cases, a document can have only one paragraph, and a paragraph can have only one sentence, or one or more character strings.

These methods have been found to be cost effective, especially when lower precision in the information measurements can be tolerated, such as in classifying documents into very distinctive classes, and can handle cases when the syntactic parser completely fails or when no syntactic parser is employed.

The disclosed system and methods can be applied to a number of areas such as document relevance ranking for search engines, automatic document classification or categorization of unstructured data, and providing contextual information for meaning disambiguation in natural language processing, machine translation, and speech recognition, etc.

Referring again to FIG. 2, the module 214 sends the document information index of one or multiple specified documents to the module 215 in the computer processing system 210. The module 215 can perform one or more of the following exemplified operations. The output data can be stored in output data 225 or to other external sources Document Relevance Ranking for Search Engines Some conventional ranking algorithms are mainly based on keywords, links, or popularity, and do not make direct reference to the information structure in the document contents. The presently disclosed system and methods are capable of producing better relevancy-ranking results than such conventional algorithms. When a user issues a search query, it is interpreted in the presently disclosed system and methods as that the user is looking for information about one or more objects by stating the object names in the query. The presently disclosed system and methods can quantitatively measure the amount of information contained in each document in the document collection, and rank the documents by the amount of information they contain about the queried object, thus providing information to the users in a more accurate and effective way. The collection of documents can include the Web pages on the Internet, documents stored in a company, an organization, and on an individual user's computer.

In the module 215, if a query matches a single object name, documents in a collection can be quantitatively evaluated for this object name using the process described above. The document information indices thus obtained about the object name as queried in the search can be used as a quantitative measure of the degree of relevancy of the documents to the query. The documents can be rank ordered according to their document information indices in the search result in the output data, which can allow a user (i.e. the inquirer) to look at documents more relevant to his or her query first.

If a query does not match a single object name but contains multiple object names, the same document collection can first be evaluated against each object name contained in the query for the amount of information each of the documents contains about each of the objects, and then a combined score can be derived based on the information index of each document about each object as the relevancy score of that document to the query. The documents can then be rank ordered according to their combined score in the search result.

Document Classification

The presently disclosed system and methods can intelligently classify documents. Once the document information indices of documents are obtained by the module 214 and received by the module 215, documents with their document information indices above a set threshold can be treated as belonging to a category defined by the object name, and stored in the output data. For example, if the class object name is "computer" or "finance", all documents with their document information indices for the object "computer" above a pre-determined threshold can be classified into the "computer" category. Documents with document information indices for the object "finance" above a pre-determined threshold can be classified as belonging to the "finance" category. The thresholds for different categories (i.e. different objects) can be the same or different.

In the presently disclosed system and methods, a document can be classified into one or more categories based on the amount of information obtained by module 214 and received by module 215 for different objects that correspond to different categories. The object name used to classify documents can be the name of a document category, or a name related to a document category. Depending on the user preference of classification, and the pre-determined thresholds, a single document may or may not belong to multiple categories.

A well-defined category system can include mutually exclusive categories, such as a category system for computer operating systems, which can have mutually exclusive subcategories of Windows, Macintosh, UNIX, etc. If a document is solely about Windows operating system, then it is likely to have a near-zero information index for the object name of UNIX or Macintosh, and will exclusively be classified into the category of Windows. However, if the document's main topic or content is about the differences between Windows and UNIX, then it is likely to have an above-threshold information index value for the object of Windows, and also an above-threshold information index value for the object of UNIX, and can be classified into both the categories of Windows and UNIX. This way, relevant information can be easily accessed from the respective categories.

Word Sense or Meaning Disambiguation in Language Understanding, Machine Translation, and Speech Recognition The presently disclosed system and methods can be applied to meaning disambiguation in computer understanding of natural language. A word in a natural language can have multiple meanings in that language. For example, the English word of "bank" can mean a bank as a financial institution, or the bank of a river. These words are ambiguous without context information. If a language understanding program only looks up its meaning from a dictionary, there are more than one potential candidate meanings to choose from. The machine is often faced with a decision about which meaning is the correct one for the context. In some conventional technologies, the decision is either based on a statistically obtained probability of the word as being used in the English language, a method that is not so reliable, or based on available context information, which is usually very difficult to obtain by machines alone.

The presently disclosed system and methods can effectively identify the most appropriate meanings of such words in their context. The context can be a phrase, sentence, a paragraph, or multiple paragraphs, or even the entire document. An information index for the sentence, or the paragraph or paragraphs, or the document for each meaning of the word can be computed. The word meaning having the highest score can be selected as the most appropriate meaning in that context.

For example, suppose the dictionary lists two meanings of the word "bank".

(1) A financial institution that handles monetary transactions.

(2) A raised boarder along a river.

If the sentence is:

(3) "The bank has enough money."

the presently disclosed system and methods can calculate sentence information indices for sentence (3) for both of the object name of "financial institution" and "river". The sentence information index will be much higher for "financial institution" than that for "river" because a term such as "money" in the sentence has a higher association-strength value for the object of "financial institution" than for the object of "river".

The above described meaning disambiguation can be applied to many areas. One such area is machine translation. As described above, a word or a phrase in a natural language may have more than one meaning. In order for a machine to properly translate a text content, a context is often needed to determine which of the multiple meanings of a word is the intended meaning or the most appropriate meaning. The presently disclosed system and methods can compute information indices for various contexts as exemplified above, and select the context that has the highest information index as the most appropriate meaning. The described meaning disambiguation methods can also be applied to computer-based natural language understanding and speech recognition to correctly identify the most appropriate meaning of a multi-meaning word or phrase, thus providing a solution to a key issue in these areas.

It should be understood that the above-described methods are not limited to the specific examples used. Configurations and processes can vary without deviating from the spirit of the invention. The methods for quantitative assessment of information in the natural language contents can be applied to areas in addition to the examples described above, including non-natural or artificial languages such as a computer programming language, or a symbolic system in which symbols that carry a meaning are used. In the case of natural language, various types of sentence structures and phrase structures exist. While they are not exhaustively exemplified in the above description, the information structure of "Object+ Properties" and the corresponding information quantification methods as described in the present disclosure should apply to any type of sentence or phrase structure. The above described techniques can be separately applied or when appropriate, applied in combination.

Moreover, the association strength can be expressed in the form of a continuous scale of numerical values or in the form of discrete ranges. The values of association strengths can be in a range between 0 and 1, and/or in other ranges. It should be understood that information indices can be defined at different levels than the examples described above. In addition to document, sentence, and phrase information indices, information index can be defined and computed for paragraphs, a string of words, or other segments of text.

Additional Embodiments for Determining Relevance Using Association Data

In the parent patent application of the present disclosure as illustrated in FIGS. 1 to 5 above, the use of the object-properties association datasets provided a novel way for determining the quantity of information contained in a document, which is otherwise not possible with conventional methods of simple keyword-matching. An additional function of the above disclosed methods is to discover the content types or topics of a document, as well as the relevance between a text content and a specific topic or concept. The example of applying the linguistic information quantification method to relevance ranking of search results as described above is a specific application of the above-disclosed methods for this purpose. It is an example of determining relevance between the content of a document and a query via a conceptual association dataset associated with the object or concept represented by the query.

The functions of determining relevance between a text content and a concept of an object can further be extended to determining the relevance between a text content and any concepts or topics, as long as a conceptual association dataset for that concept or topic is available. In the present disclosure, more methods are disclosed for determining such relevance and for their applications in areas including search result ranking, document classification, word sense or meaning disambiguation, question answering, and relevant advertising, etc., as will be described below.

In U.S. Provisional Patent Application 61/682,205 titled "System and Methods for Determining Term Importance and Relevance Between Text Contents Using Conceptual Association Datasets" filed by the present inventor on Aug. 11, 2012, new methods are disclosed for determining the relevance between text contents using the conceptual association datasets based on the object-properties association model, and based on the grammatical or semantic attributes of the terms in the text content.

In the present invention, the object-specific dataset in the above disclosure is interchangeably referred to as a conceptual association dataset for ease of description of the new applications of the methods that will be described below. And the term "object", "concept", and "topic" are also interchangeably used for different applications.

As was illustrated in FIG. 1, an example of a conceptual association dataset for the object or the concept of "Computer" contains a plurality of terms as the names of properties associated with the concept or object. Each property has a corresponding value indicating the association strength of the property with the object or concept of "computer".

Figure 6A:
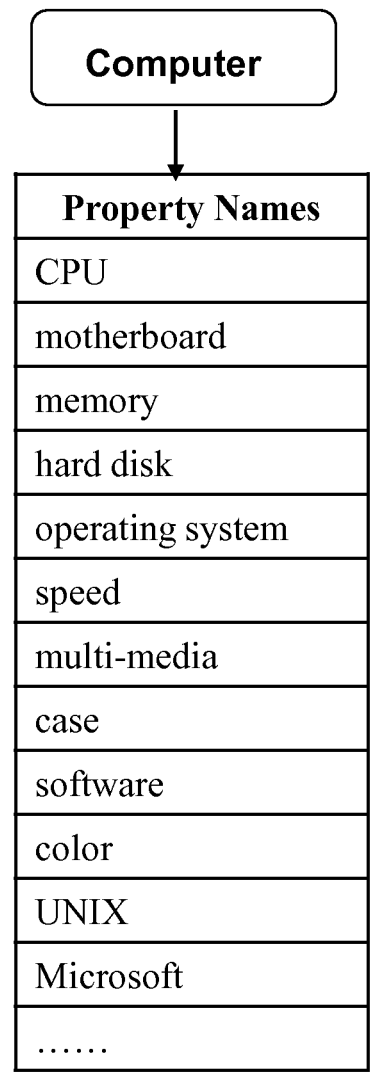

In some embodiments of the present invention, the column containing the numeric values that represent association strengths between the property terms and the concept can be optional. In some other embodiments, the association strengths for different property terms can be a constant (e.g. having a value of 1 for all property names). When this is the case, having a constant association strength value can be considered as being equivalent to having no association strength value, which is equivalent to only having property terms in the dataset without the association strength column. FIG. 6A shows an example of a one-column dataset adapted from FIG. 1. The dataset can still be used to determine the relevance between a text content and a concept or a topic.

In some other embodiments, the property terms in the dataset can have more than one column of association strength values, or other values related to the association strength. For example, some association strength values may be different depending on the specific context, such as a word or phrase being associated more or less strongly with the concept when the word or phrase is a verb of the subject of a sentence in which the subject represents the concept name, or when the word or phrase occurs in a specific region or position in the text content or in a sentence or paragraph, or in relation to some other words or phrases as its context. FIG. 6B shows an example of a two-column association strength value dataset adapted from FIG. 1. The values in the second column can reflect the context-determined strengths that may be different under different contexts.

Figure 7:
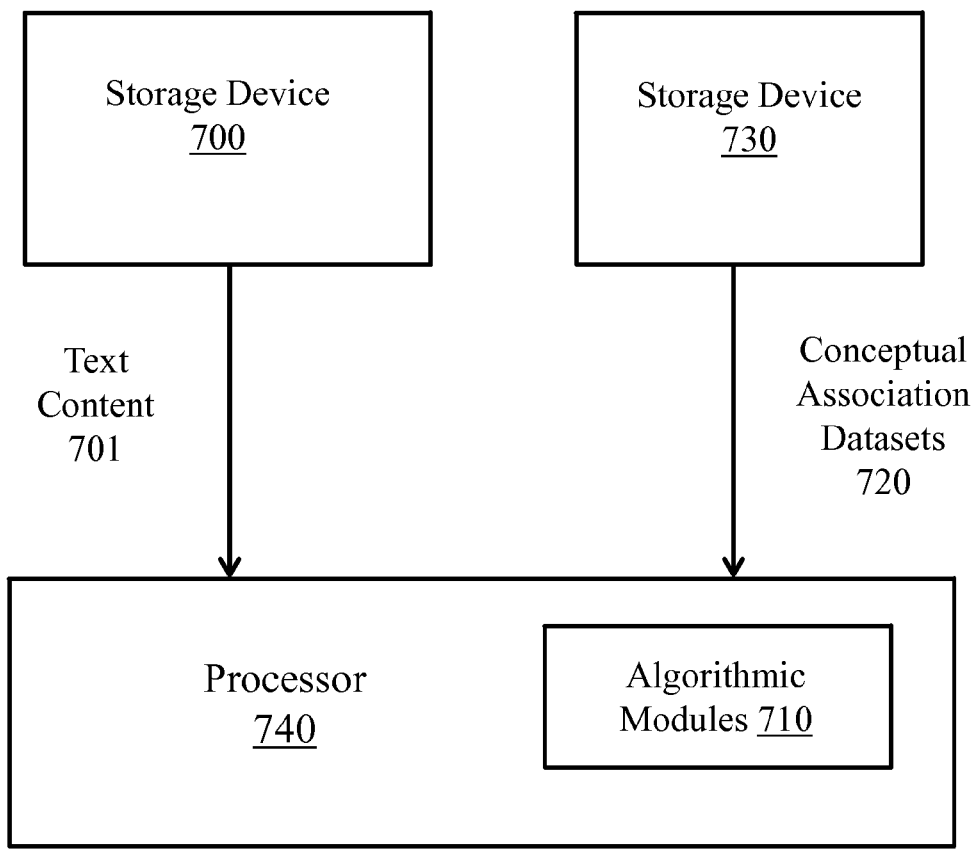
FIG. 7 is a system block diagram illustrating the components of the system that can be used to determine the relevance between one or more documents with a conceptual association dataset in accordance with the present invention.

In some embodiments, the components of a system that can be used to determine the relevance between a text content and a concept or a topic are illustrated in FIG. 7. A text content 701 is stored in storage device 700, and are input into processor 740. The processor includes algorithmic modules 710 that analyze the content of the text content. The processor further retrieves a conceptual association dataset 720 from a plurality of datasets from a storage device 730, each of such datasets being associated with a different concept or topic or attribute, and calculates a relevance score R between the text content and the conceptual association dataset. If the relevance scores R is above a pre-defined threshold, the processor outputs a signal indicating that the text content is relevant to the concept or topic, otherwise, the processor outputs a signal indicating that the text content is not relevant to the concept or topic. The system can take further actions with the relevance signal, such as to display a relevant document or email, etc., to the user, or display one or more names of the concepts or topics that are relevant to the text content, sometimes as answers to a question about the topic of the text content, or as a domain for suggesting an advertisement, etc.

In some embodiments, the system may check the relevance not by retrieving a single dataset at a time, but retrieving multiple datasets in a certain way or in a combined format, and concurrently checking multiple datasets to find a most relevant dataset that shows the highest relevance value for the text content being compared. As will be discussed later, in some embodiments, the multiple conceptual association datasets can be retrieved in the form of a table or matrix, with each individual dataset constituting a column or row of the table. In some embodiments, terms can be the first column in the table, and the corresponding association strength values with each concept or topic can be the rows of the table. And in some other embodiments, the multiple conceptual association datasets can be retrieved in the form of an inverted index, with each term being an entry in the index, and the corresponding association strength values represented in what is commonly known as a posting corresponding to that term. In some other embodiments, the multiple conceptual association datasets can be retrieved in the form of a hierarchical structure like a tree.

Figure 8A:
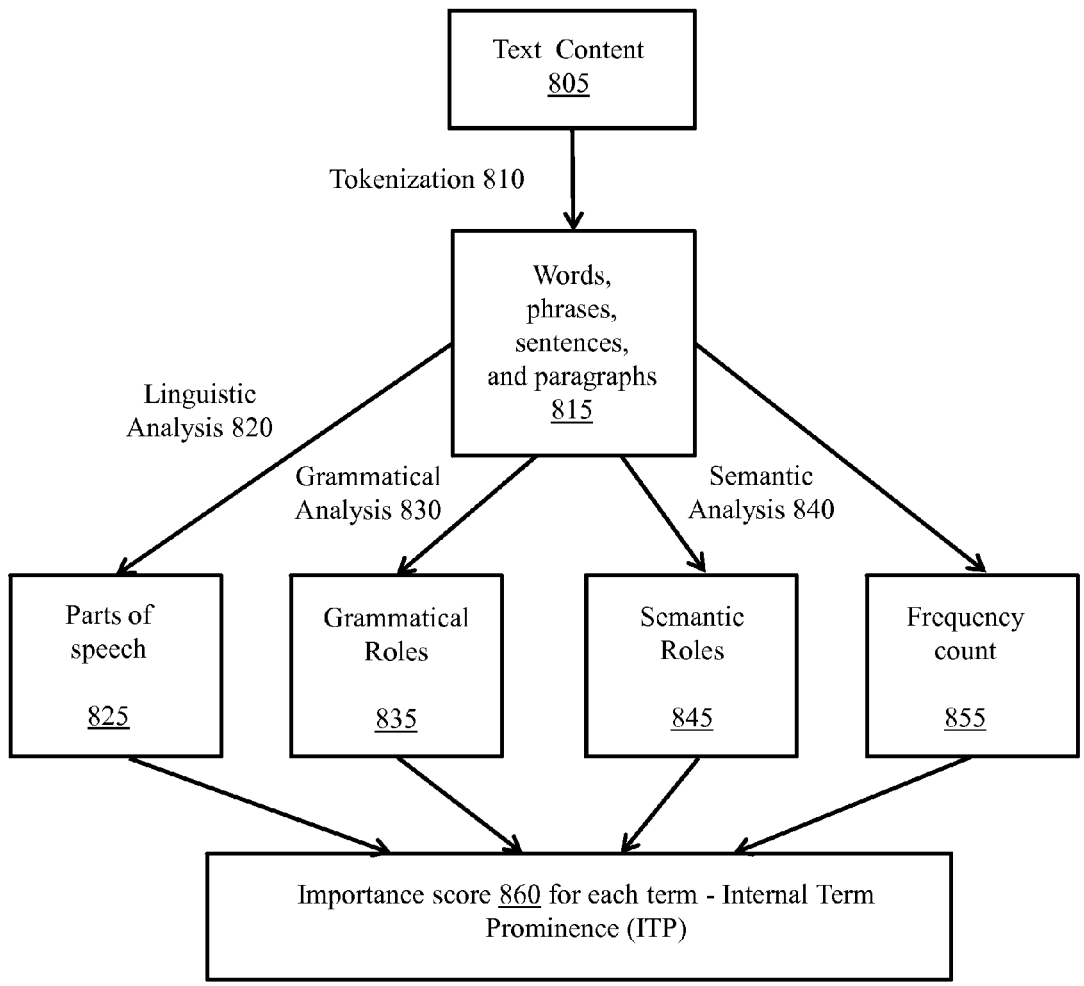
FIGS. 8A and 8B are flow diagrams illustrating the steps of analyzing the text content.

The system first analyzes the text contents as they are input. FIG. 8A is a flow diagram illustrating the steps of analyzing the text content. In FIG. 8A, a text content 805 is first tokenized (810) into one or more tokens, each can include one or more words, phrases, and in some cases, can also include one or more sentences or even paragraphs, whenever applicable. Each token can be an instance of a unique term in the text content, which can have more than one token instance. For example, the word "camera" is a term, which can occur more than once in a text content, and each of its occurrence is a token instance of the term "camera". In the following description, the word "term" and "token" may also be interchangeably used when applicable.

For each term or its tokens 815, as an optional step, an importance is determined, and an importance score can be calculated based on a number of factors. Linguistic analysis 820 can be applied to identify the parts of speech of each word or phrase 825, such as a noun or a noun phrase, a verb or a verb phrase, an adjective or adverb, or a preposition or a prepositional phrase, a pronoun, etc. Then, optionally, grammatical roles 835 are identified (830) for words and their phrases such as whether a noun is a subject of a sentence, or a direct or indirect object of a verb, or a head or a modifier of a multi-word phrase, etc. A sentence can also be identified as an independent clause, or a dependent clause of various types such as a relative clause or an adverbial clause, etc. Optionally, semantic analysis 840 can also be performed to identify the semantic roles or semantic attributes or attribute values 845 of these words or phrases such as whether a noun is referring to an actor or agent of an action, or a recipient of an action, or an instrument, or whether an adjective is referring to a state, or an attribute of something, or whether a term is the name of a product or service, or indicates a positive or negative opinion, etc. Furthermore, the frequency count 855 of each term or its tokens occurring in the text content is also obtained as an importance factor. Then, an importance score 860 of a term is calculated based on one or more of the operations in steps 810-855. The importance score 860 is also referred as Internal Term Prominence (ITP) in the present application and above referenced disclosure.

In the present invention, the term "parts of speech" refers to the classes or categories of word or phrases as they are used in a sentence. In traditional grammar, each word in a sentence can be labeled with a class name such as a "noun", "verb", "adjective" "adverb", "preposition", "article" "conjunction" and other classes. In some embodiments, parts of speech are treated as a form of the grammatical attributes of a word or a phrase.

In one embodiment, the method for the calculation of the importance score is to simply count the frequency of each term occurring in the text content.

In another embodiment, the method is to first assign weighting coefficient values to the terms according to their parts of speech. For example, a noun or noun phrase may be assigned a weighting coefficient of 0.9, while a verb or verb phrase can be assigned a weighting coefficient of 0.7, or a preposition can be assigned a weighting coefficient of 0.2, or a pronoun or an article can be assigned a weighting coefficient of 0.1 (to indicate their relatively lower importance), and such values can be used as the importance score of the term.

In yet another embodiment, the method is to first assign weighting coefficient values to the terms according to their grammatical roles. For example, a term that is the subject of a sentence may be assigned a weighting coefficient of 0.9, while a term that is the predicate of the sentence can be assigned a weighting coefficient of 0.8; a term that is the head of a subject phrase (such as the word "camera" being the head of the phrase "digital camera") can be assigned a weighting coefficient of 0.6; a term that is a modifier of a subject phrase (such as the word "digital" being a modifier in the phrase "digital camera") can be assigned a weighting coefficient of 0.5; a term that is a head of a predicate phrase can be assigned a weighting coefficient of 0.4; and a term that is a modifier of a predicate phrase can be assigned a weighting coefficient of 0.3, etc., as its importance score.

As is described above, in some embodiments, both grammatical roles and parts of speech can be referred to as the grammatical attributes of a word or a phrase.

In yet another embodiment, the method is to first assign weighting coefficient values to the terms according to their semantic roles. For example, a term that is the "actor" of an action (such as the word "John" in "John broke the window") may be assigned a weighting coefficient of 0.9, while a term that is the "recipient" of an action (such as the word "window" in "John broke the window") can be assigned a weighting coefficient of 0.8; a term that is an "instrument" (such as the word "stone" in "John broke the window with a stone") can be assigned a weighting coefficient of 0.6; and a term that indicates a state or an attribute (such as the word "running" in "John is running") can be assigned a weighting coefficient of 0.4, etc., as its importance score.

In yet another embodiment, the method is to first assign weighting coefficient values to the terms according to their semantic attributes or attribute values. For example, a term that is the name of a product or service may be assigned a weighting coefficient of 0.9, while a term that indicates an interest such as "like", "interested in", etc., can be assigned a weighting coefficient of 0.8; a term that indicates a positive opinion such as "good", or "fantastic", etc., can be assigned a weighting coefficient of 0.6; and a term that indicates a negative opinion can be assigned a weighting coefficient of 0.5, etc., as its importance score.

In yet another embodiment, the method is to combine two or more of the above weighting coefficient values to produce the importance score of the term, such as when a term occurs as a noun in one instance, and as a verb in another instance, or as the subject of a sentence in one instance, and as the object in another instance.

In yet another embodiment, the method is to use one or combine two or more of the above weighting coefficients, and then to multiply the frequency of the term by the weighting coefficient value to produce the importance score of the term.

Figure 8B:
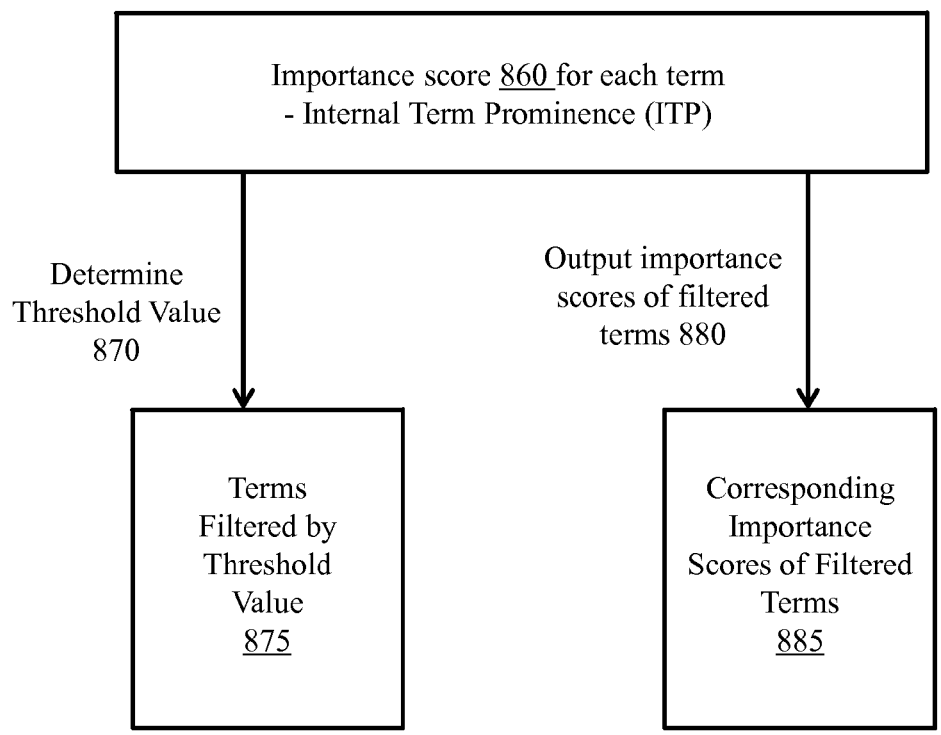

Once the importance score 860 is determined, those terms having importance scores above a threshold can be selected and output to the next step (870) as illustrated in FIG. 8B. Optionally, the corresponding importance scores can also be output (880).

In some embodiments, the terms 875 selected (i.e. filtered by the threshold value) and output from the text content using the above described methods can be used as topic terms of the text content, or as a representation of the text content (870). Optionally, the corresponding importance scores 885 can also be output as part of the representation of the text content (880).

In some other embodiments, the importance score of a term can be further determined in combination with a corresponding score of the same term from one or more other text contents herein referred to as "external contents", and the corresponding score of the same term is herein referred to as "External Term Prominence" score, or ETP, in short. In some embodiments, the external contents used for obtaining ETP score can be a collection of random text contents.

Figure 9:
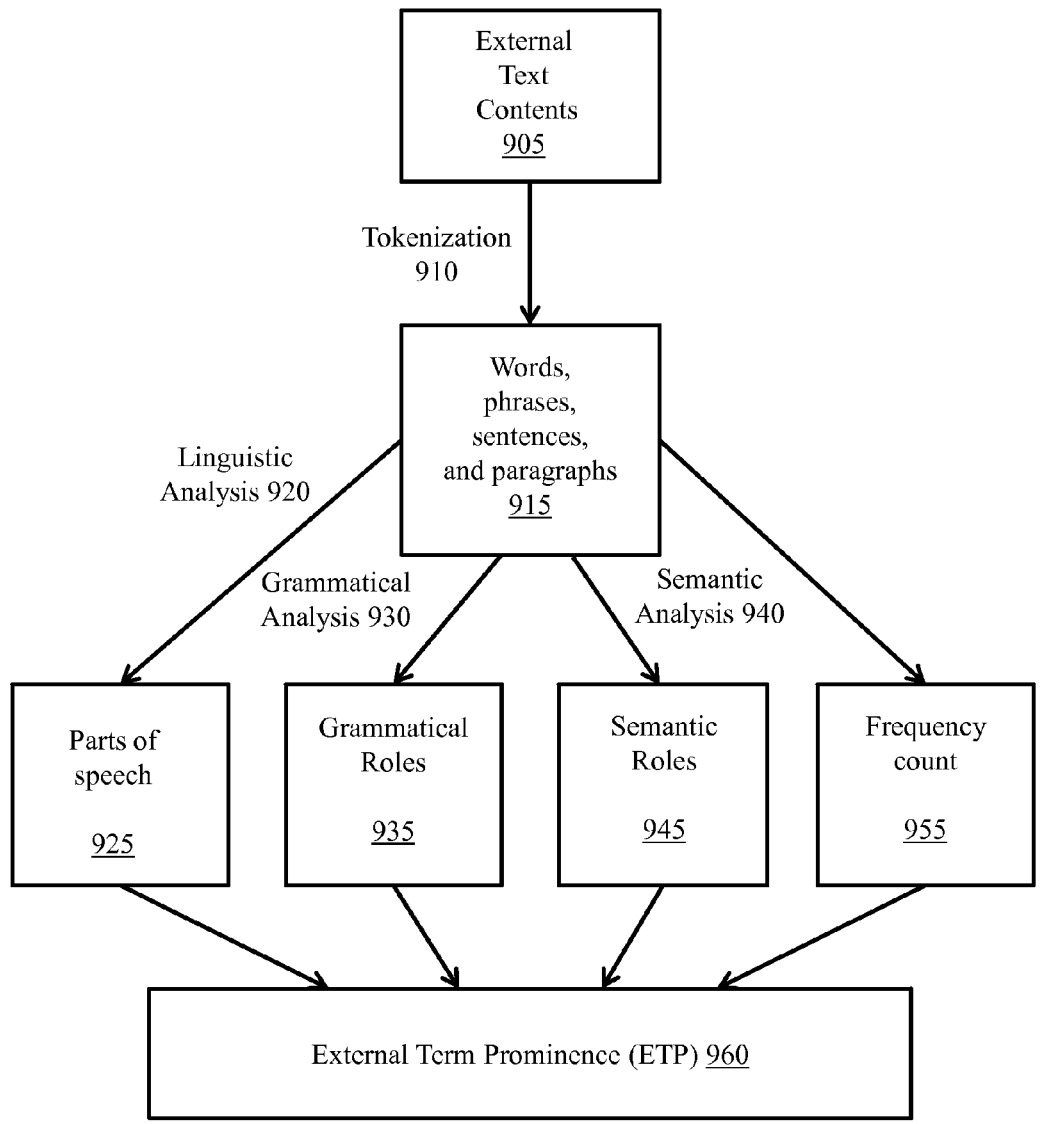
FIG. 9 is a flow diagram illustrating the process of obtaining ETP values for terms from a plurality of external contents.

FIG. 9 is a flow diagram illustrating the process of obtaining ETP values for terms from a plurality of external contents using the similar steps as described in conjunction with FIG. 8A for each such external content, and then averaged by the total number of external contents used. When applicable, an external text content 905 is first tokenized (910) into words, phrases, sentences, and paragraphs. For each token comprising a word or a phrase 915, as an optional step, an importance score can be calculated based on a number of factors. Similar to the steps illustrated above in FIGS. 8A and 8B, linguistic analysis 920 can be applied to identify the parts of speech of each word or phrase 925, such as a noun or a noun phrase, a verb or a verb phrase, an adjective or adverb, or a preposition or a preposition phrase, a pronoun, etc. Then, optionally, grammatical roles 935 are identified through grammatical analysis 930 for such nouns or verbs and their phrases such as whether a noun is a subject of s sentence, or a direct or indirect object of a verb, or a head or a modifier of a phrase, etc. A sentence can also be identified as an independent clause, or a dependent clause of various types such as a relative clause or an adverbial clause, etc. Optionally, semantic analysis 940 can also be performed to identify the semantic roles or attributes 945 of these words or phrases such as whether a noun is referring to an actor or agent of an action, or a recipient of an action, or an instrument, or whether an adjective is referring to a state, or an attribute of something, or whether a term is the name of a product or service, or indicates a positive or negative opinion. Furthermore, the frequency count 955 of each term occurring in the text content is also obtained as an importance factor. Then, an external term prominence (ETP) 960 of a term is calculated based on one or more of the operations 910-955.

FIG. 10 shows an exemplified ETP dataset with hypothetical terms "computer", "CPU", "Memory", "hard disk", and "software", and their corresponding ETP score values for "parts of speech", "grammatical roles", "semantic roles", and "frequency count".

To distinguish from the external score, the original term importance score obtained from the text content using the steps as described in FIGS. 8A and 8B is herein and hereafter named "Internal Term Prominence" score or ITP in short.

When ETP score is used for determining the term importance score in a text content, in some embodiments, the final score is determined by the following formula, wherein $S\_j$ denotes the final term score of the j-th term in a plurality of terms in the text content.

$$S\_j = ITP - ETP \qquad \text{Eqn. (1)}$$

In some other embodiments, the final score of $S\_j$ for the j-th term in the text content is determined by the following formula.

$$S\_j = ITP*ITP*/(ITP+ETP) \qquad \text{Eqn. (2)}$$

Optionally, a normalization method can be applied to make the final score within a specified range when desired.

The methods of determining the term importance based on the grammatical attributes and internal and external term prominence are also disclosed in U.S. patent application Ser. No. 12/972,462 entitled "Automated Topic Discovery in Documents" filed by the present inventor on Dec. 18, 2010 and U.S. patent application Ser. No. 12/782,545, entitled "System And Methods for Automated Document Topic Discovery, Browsable Search and Document Categorization" filed on May 18, 2010 by the present inventor.

Once the importance score is determined in combination of ETP by using Equation 1 or Equation 2, a threshold can be defined such that only those terms with importance scores above the threshold can be selected and output to the next step like in 870. And optionally, the corresponding importance scores can also be output like in 880.

In the same manner as with ITP scores as described above, in some embodiments, the terms selected and output from the text content using the above described methods can be used as topic terms of the text content for various purposes, or as a representation of the text content like in 870. Optionally, the corresponding importance scores can also be output as part of the representation of the text content like in 880.

As is described above, calculation of importance scores for tokens in the text contents is optional, but can provide the benefit of more accurately determining the relevance. For illustrative purposes, most of the following examples are based on embodiments that calculate the importance scores for tokens in the text contents using one or more of the factors as illustrated above. It should be noted that such importance scores are optional for the purpose of using the methods of the present disclosure to determine the relevance between a text content and a concept or topic or a dataset representing a concept or a topic or an object, etc.

Figure 11:
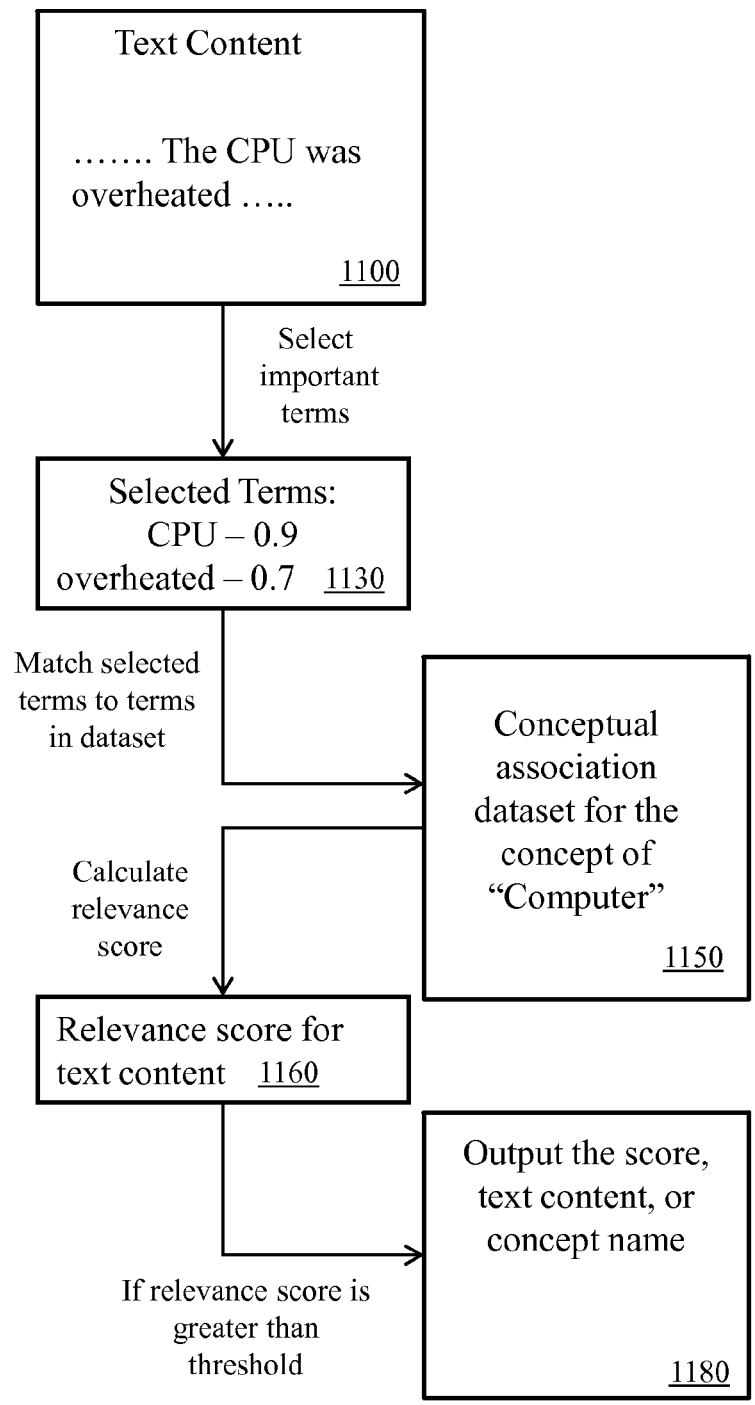
FIG. 11 is an exemplified flowchart for determining the relevance between a text content and a concept represented by a conceptual association dataset in accordance with the present invention.

As described above, the conceptual association datasets are concept specific. Each different concept has its own association dataset. FIG. 11 illustrates exemplified steps for determining relevance between a text content 1100 and a concept or a conceptual association dataset 1150 using a conceptual association dataset. Using the concept "Computer" as an example, property terms and their association strengths relative to "computer" are shown in FIG. 1. As described earlier, use of the varying association strengths are optional, but can enhance the accuracy. In some cases, association strengths are constant.

FIG. 11 illustrates an example of determining the relevance between a text content and a concept using the conceptual association dataset. For a text content contains such text as "The CPU was overheated", important terms selected from the text 1130 include "CPU" (with a hypothetical importance score of 0.9), and "overheated" (with a hypothetical importance score of 0.7).

In the present invention, the terms from the text content is matched with a conceptual association dataset 1150. An example of the conceptual association dataset 1150 is shown in FIG. 1. In this example, there is a match for the word "CPU", but no match for the word "overheated".

In some embodiments, the relevance score 1160 between the text content and the conceptual association dataset in this example can be determined to be 1 for one match, and can be incremented to 2 if the word "overheated" also had a match.

In some embodiments, the frequency of the matching term in the text content can also be used to determine the relevance score 1160 between the text content and the conceptual association dataset by adding the frequency of the matching terms to the total count. In this example the frequency of the matching term "CPU" in the text content is 1 for one occurrence of the word "CPU", but can be more than 1 in text contents other than this example.

In some embodiments, the relevance score 1160 between the text content and the conceptual association dataset in this example can be determined to be 0.9 based on the term's importance score in the text content 1100, and can be incremented to 0.9+0.7=1.6 if the word "overheated" with its term importance score being 0.7 also had a match.

In another embodiment, the relevance score 1160 between the text content and the conceptual association dataset in this example can be determined to be 0.99 based on the association strength value of the property term of "CPU" (as shown in FIG. 1) that matches the term from the content 1100, and can be incremented by another association strength value of "overheated" if the word "overheated" also had a match.

In another embodiment, the relevance score 1160 between the text content and the conceptual association dataset in this example can be determined to be 0.9*0.99=0.891 if the term importance score is multiplied by the association strength of the term "CPU" in the dataset, and can be incremented if there were 2 or more matched terms.

In another embodiment, the relevance score 1160 between the text content and the conceptual association dataset in this example can be determined to be 0.9+0.99=1.89 as the sum of the term importance score and the association strength of the term "CPU" in the dataset, and can be incremented if there were 2 or more matched terms.

Users have the option to use one or more of these scores as a measure of relevance. For a hypothetical threshold value of 0.2, the text content 1100 is considered to be relevant to the concept of "Computer" since all its scores are above this threshold.

The different embodiments described above based on term importance score provide different ways for determining the relevance. They involve different degrees of complexity in terms of implementation, and can produce results with different degrees of precision. Based on the experimental data from the present inventor, embodiments such as those that do not involve grammatical or semantic analysis require less processing, and are easier to implement, and are suitable for use cases where high precision is not required, while those embodiments that involve grammatical or semantic analysis can produce more accurate results.

The accuracy of determining the relevance based on matching the words or phrases in the text content with the words or phrases in the dataset can further be enhanced when more contextual information or more grammatical or semantic information is utilized than in the methods described above.

In some other embodiments, the text content is first divided into a plurality of segments, such as one or more words or phrases or sentences or paragraphs, etc. Tokens in each segment are checked with the dataset. Instead of counting the total number of tokens that match a property term, a method in which context information is mostly excluded, a better method is to count the number of segments that contain at least one matching token. The total number of segments that contain at least one matching token can be used for the calculation of the relevance score, or it can also be divided by the total number of segments in the text content.

In some embodiments, the type of segments can also be used as a factor for determining the relevance score. For example, a weighting co-efficient can be determined based on whether the segment being checked is a phrase, or a sentence, or a paragraph, etc., or whether two or more matching tokens are in the same phrase, or sentence, or paragraph, etc.

In some embodiments, the number of matching tokens in a segment can be used to first determine a relevance score for the segment. The relevance score of each segment can be summed up to a total score in certain way. In some other embodiments, the total score can be divided by the total number of segments in the text content, or in relation to the number of non-matching tokens in the segment.

In some embodiments, the relevance score can also be determined based on the position of a sub-segment containing a matching word or phrase in the text content, or the position of the matching tokens in the segment, based on the same principle that words or phrases in different positions in a segment or the text content can carry different amounts of information, or different degrees of information focus.

In some embodiments, the contextual information can also be used in combination with the association strength values of the matched property terms, similar to the way they are used as illustrated with FIG. 11 above.

When more contextual information is available, such as the grammatical roles or parts of speech or semantic attributes of the tokens that match a property term, higher accuracy can be achieved. For example, as is also illustrated in the referenced disclosure, if the word "CPU" is the subject of the sentence, and the word "overheated" is the predicate or part of the predicate of the sentence, and if both words have a match in the conceptual association dataset, then the relevance score can be a much larger value than in other cases to indicate that what the sentence is talking about is closely related to the topic or concept of "computer", etc.

Furthermore, as illustrated in FIG. 6B, in some embodiments, the property terms in the dataset can have multiple association strength values corresponding to specific context, such as whether the property term occurs as a noun, or a verb, or in relationships with other terms, etc. When such data are available, the methods described above can be used with such data for more accurate results based on more context information.

In some embodiments, the above-described methods for determining the relevance score can further be combined with the methods disclosed in the parent patent application of the present application as illustrated in FIGS. 1 to 5. For example, the relevance score can be determined by multiplying the score of a word or phrase that is a subject of a sentence and the score of the word or phrase that is the predicate or part of a predicate of the sentence, or by multiplying the score of a word or phrase that is a modifier of a multi-word phrase and the score of the word or phrase that is the head of a phrase. This method can be used with or without other co-efficients for their respective grammatical or semantic attributes; and calculation methods other than multiplication can also be used.

Figure 12:
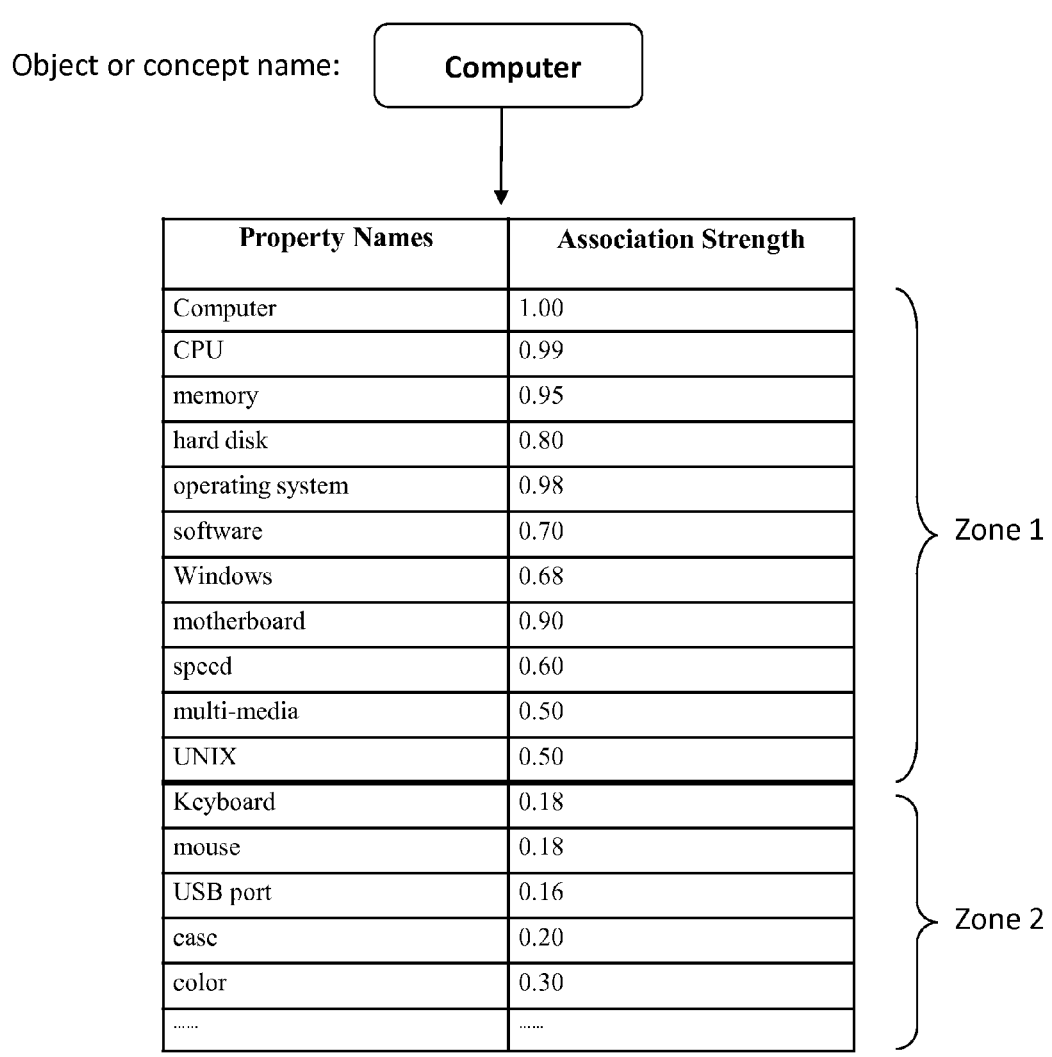
FIG. 12 illustrates the definition of zones using the data table in FIG. 1.

In some embodiments, the conceptual association dataset is divided into zones as shown in FIG. 12. One of the criteria for dividing the dataset into zones can be based on a property term's association strength value being above a predefined threshold value and below another threshold value, or based on other factors that are determined by the users for specific purposes. When such zones are defined, the relevance score of a text content can be determined by how many terms in the text content are matched with property terms in different zones. For example, for a text content of "The keyboard requires a USB adapter", the term "keyboard" has a matching property term in zone 2 in FIG. 12. The relevance score between the text content and the conceptual association dataset can be 1 for one match only. However, in this case with the matching property terms in zone 2, the user can apply a coefficient value such as 0.6 to the score to indicate that the match is in zone 2, and thus may have a lower relevance. Alternatively, the user can apply a coefficient value such as 1.2 to the score to indicate that the match is in zone 2, and thus may indicate that the contents are relevant in terms of specific properties of the concept of "computer".

When zones are used, the calculation can also utilize term importance score or association strength values as additional factors to determine the relevance score similar to the methods described above when zones are not used.

In some embodiments, when the matching terms are distributed in different zones of the conceptual association dataset, the relevance score can be a function of the count of matching terms in the different zones, or the scores calculated from the terms in the different zones as described above.

Similar to the examples in the parent patent application of the present invention, the presently disclosed methods can be applied to many areas, including concept-based document search and result ranking, document classification, spam email filtering, word sense or meaning disambiguation, question answering, user intent detection and advertising, job search, etc.

In some embodiments, the relevance score between a text and the concept or topic can be used to classify or categorize the text content into a document class or a category or a topic of interest defined by the conceptual association dataset. Users can pre-determine a threshold, and if the relevance score between the text content and the concept or topic is above the threshold, the text content can be considered being a member of a category, or being about certain topics represented by the concept. For example, with their relevance score to the concept or topic of "computer" being above the threshold, the contents in the example sentences above can be both recognized as being about the topic of "computer", or can be associated with a document class of "computer".

A special case of document classification is what is known as spam email detection and filtering. The present invention can also be applied for this purpose. A dataset containing terms that are related to known spam emails can be obtained by various ways. An email can be checked against the dataset using the system and methods of the present invention. If the email is found to have enough relevance with the dataset representing a spam email, appropriate actions can be taken to filter the email from non-spam emails.

In some embodiments, the present method can be used in concept-based document search and relevance ranking. For example, if the query is "computer", documents that do not necessarily contain the keyword "computer", but contain content such as "The CPU was overheated", or "The hard disk still has plenty of free space", etc, are conceptually relevant to the query. Conventional search methods based on keywords match will not be able to find such documents as relevant documents to the query. However, using the present methods, in processing the query, a conceptual association dataset related to the object or concept or topic of "computer" can be retrieved, such as the example in FIG. 1, which can contain conceptually related property terms such as "CPU", "hard disk", etc. Even a simple count of the matched terms can provide a quantitative measure of the relevance between the document and the query, and the document can not only be retrieved in a search result, but can also be ranked by the relevance score calculated using the present methods as described above.

In some embodiments, the present method can be used for providing context information for identifying the contextually appropriate meaning or sense of words or phrases that have multiple senses or meanings. In the same way as described above in the parent patent application of the present disclosure with the example of the word "bank", the two meanings or senses of the English word of "bank" as a financial institution, or as the bank of a river can be disambiguated using the present methods with available context information. Using the previous example from the referenced disclosure, if the content is "The bank has enough money", the presently disclosed methods can calculate the relevance between the content and the object or concept of "financial institution" and "river", using corresponding datasets. The relevance score will likely be much higher for "financial institution" than that for "river" because a term such as "money" in the content is more likely to have a match with a property term associated with the object or concept of "financial institution" than for the object or concept of "river".

In some embodiments, the present method can be used for providing answers to questions about the related topics or concepts of a text content. For example, if the question is "Which city is Golden Gate Bridge located?" in answering the question by a computer program, the program can retrieve and search in one or more conceptual association datasets, such as a dataset related to the topic or concept of "San Francisco", which is likely to have property terms such as "Golden Gate Bridge", "city", etc. Using the present method for calculating a relevance score between the question and the conceptual datasets, an appropriate answer to the question can be provided. The system can also provide more than one answers if more than one conceptual datasets are found to have high-enough relevance. This association-based method does not require much reasoning, which can be more challenging in solving practical problems.

The present method can further be used in detecting user interest or intention. For example, if a user posts a comment on a social network or in an email or chat message such as "We will visit San Francisco next week, and will go to New York next month", this expression can be treated as a text content, and can be compared with one or more conceptual association datasets using the above-described methods. If the dataset for the concept or topic of "travel" is available, then it will likely contain such property terms as "visit", "San Francisco", "New York", "go to", etc., and with or without additional contextual information based on the grammatical or semantic attributes associated with the words or phrases in the expression, the comment will likely be recognized as being relevant to the topic of "travel". Thus, it can be inferred that the user is interested in travelling or likes the activity of travelling. Even though the user may have not explicitly disclosed in his/her user profile about this interest, and even though the user's expression does not contain the word "travel", the user's interest and intention can still be detected, and can be used for accurate advertising or other purposes.

In some embodiments, the presently disclosed system and methods can further be used to build a user profile for advertising and other purposes based on detected user interest. For example, if a user expressed his/her travel plans and experiences in different place over a period of time, such as in the above examples with San Francisco/Golden Gate Bridge, etc., even though the specific places and time the user mentioned about his/her travel plans/experiences are different, such as one time for New York, and another time for Los Angeles, etc., when the concept of "travel" or a related concept is often found to be relevant to the user expression, a dynamic user profile can be built based on the frequency of such relevant concepts being invoked, and relevant advertisements can be displayed to the user even when the user is not specifically saying something about travel.

A related area where the present system and methods can achieve effective and economical results is in Internet-based, or social network-based, or local computer-based, or mobile device-based advertising. In the conventional context-based advertising, advertisements are displayed based on user activity or the user generated text contents as a source of information about what the user is interested in or intends to do, and then using this information as the context such that relevant advertisements can be displayed based on user's current or past interest or intention. While this method is more effective than non-context-based advertising for both consumers and advertisers, conventional methods are still mainly based on matching the keywords that occurs in the user generated text contents or web sites that the user visits and keywords that the advertisers pre-define as being relevant. A disadvantage of such conventional methods is that many relevant contexts can be missed because of the lack of keyword match.

For example, if a search query, or a user comment on a social network, or an email or an online chat message, or an SMS message, or a transcript from an audio or text conversation, etc., contains such words as "San Francisco hotels", advertisements from hotels in the San Francisco area may be displayed. However, if the query or the user comment contains such words as "stay in San Francisco", or "stay near Golden Gate Bridge", and if the hotel advertiser does not pre-define keywords such as "stay", "Golden Gate Bridge", etc., as relevant, their ads may not be displayed, even though they can be highly relevant to the context.

However, using the system and methods disclosed in the present invention, even if the hotel advertiser only pre-defines relevant words such as "hotel", by checking concepts such as "travel", or "San Francisco", etc, with their corresponding association datasets, which will likely contain terms such as "flight", "hotel", "car rental", "stay", "sightseeing", etc., the relevance between the user query or user comment and the hotel advertisement can be discovered, and the related ads can be displayed to achieve desired results. The advertisement can be displayed as a banner advertisement at a web user interface or in a promotional email, etc. In this case, users can be better served, and more economical-financial benefits to the advertisers can also be achieved when compared to the conventional advertising methods without using the presently disclosed system and methods.

In some embodiments, the present invention can be used to determine the relevance between two or more text contents. For example, if the conceptual association dataset is about a job category or an employment domain, containing property terms such as job type, skills, and responsibilities, and one text content is a resume and another text content is a job description from an employer, and both contents are determined to be relevant to the job categories, then the system of the present invention can display or match the resume with the job description, even though the two contents may not contain the same keywords. For example, if the resume contains the keyword of "programmer", and the job description contains the keyword of "software engineer" without also containing the keyword "programmer", the conventional search methods may fail to find that the two contents can be relevant. However, with the system and methods of the present invention, the two contents can be determined to be relevant, and a match can be found. Generally speaking, contents other than the resume and job description can also benefit from the present invention, such as two documents using different keywords but related to a similar domain, or one content being a user expression of some kind, and the other content being an advertisement, such that if the two content are relevant to each other, appropriate advertisements can be displayed to the user.

Furthermore, in addition to determining the relevance between a text content and a concept or topic, and determining the relevance between two or more text contents as described above, in some embodiments, the present invention also provides methods for determining the relevance between two or more concepts or topics, that are represented by their respective association datasets. For example, the present invention can determine the relevance or closeness of the concept of "computer" with the concept of "smart phone" by comparing their respective association datasets, each having its own property terms or corresponding association strength. In some embodiments, the method is to count the number of property terms in one dataset that match the property terms in the other dataset. In some other embodiments, the method can also include the corresponding association strength in determining the relevance or semantic closeness or distance between the two concepts or topics. Other methods as described above in the present invention can also be used whenever applicable.

In addition to determining the relevance using a single conceptual association dataset one at a time, the present methods can be further extended to determine the relevance between a text content and a plurality of different conceptual association datasets in a single operation, and rank the concept or topic names in the output by their respective relevance scores to the text content.

This can be particularly useful for document classification or categorization, as well as for word sense disambiguation as described above, and other applications like targeted advertising. For one example of document classification, a single text content such as a regular document can belong to more than one categories depending on the content of the document. Instead of checking with different conceptual association datasets as different document class definitions one by one, the plurality of the datasets can first be organized into a data structure in the form either as a term-concept matrix or table, or an inverted index, similar to the format of a term-document matrix or an inverted index that are used in traditional document search or information retrieval, but with the elements being the conceptual association datasets in the present case, different from the documents in a database for search purposes.

In some embodiments, each dataset can be treated as a term vector, and the plurality of the term vectors representing the plurality of the concepts or topics can be organized into a term-concept or term-topic matrix, in which the values of the association strength will be zero for all terms that are not contained in a specific conceptual dataset. FIG. 13 illustrates the structure of such a term-concept or term-topic matrix.

In FIG. 13A, concept names are shown in 1310, and terms are shown in 1320. The values 1330 are either 1 or 0, indicating whether a term is a property term of the concept or not. In FIG. 13B, the values can be exemplarily between 0 and 1, indicating the association strength of the term as a property term of the concept or not. In some embodiments, the values can be either greater or smaller than the examples in FIG. 13B.

Figure 14:
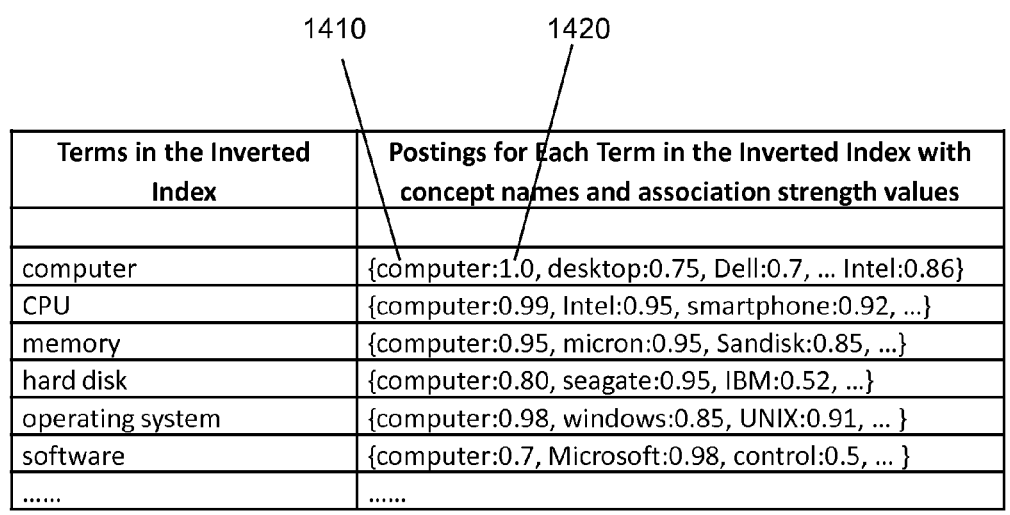
FIG. 14 illustrates the structure of a term-concept or term-topic inverted index.

In some other embodiments, each dataset can be treated as a term vector, and the plurality of the term vectors representing the plurality of the concepts or topics can be merged into an inverted index of terms each with pointers to the concept dataset names that contain the term, and optionally, also to their respective association strength or weight values. In some embodiments, if the association strength value is below a threshold, the entry can be removed from the pointers to reduce storage space or processing requirements. Such pointers are sometimes known as postings in the index. FIG. 14 illustrates an exemplar structure of such a term-concept or term-topic inverted index, with concept names such as "computer", "desktop", "Dell", "Intel", etc. (1410), and their corresponding hypothetical association strength values (1420).

Figure 15:
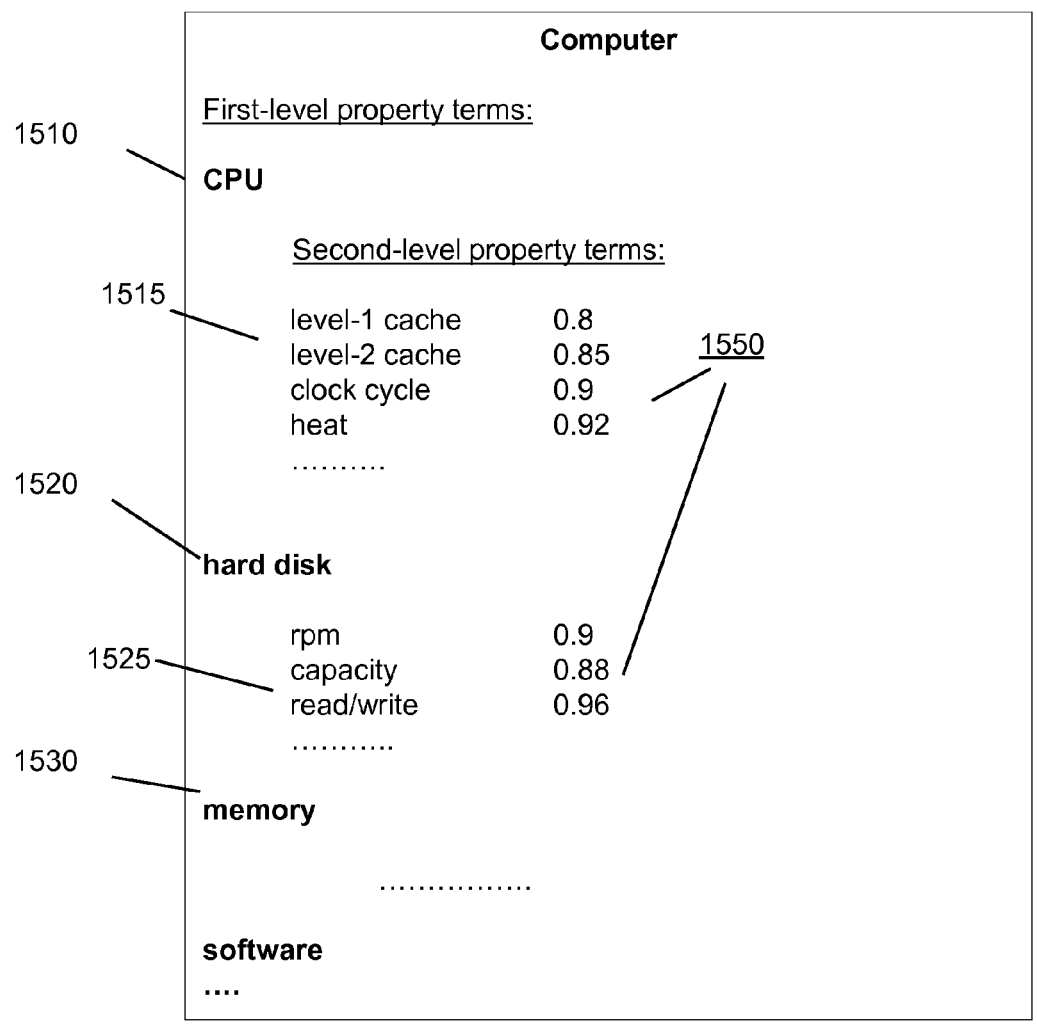
FIG. 15 illustrates an exemplar hierarchical structure of object or concept and properties association.

Furthermore, in some other embodiments, the multiple datasets can form a hierarchical structure representing different levels of association data. FIG. 15 is an exemplar illustration of the structure. In FIG. 15, one or more of the property terms (1510, 1520, 1530) in a dataset can have a second-level association dataset (1515, 1525), comprising one or more property terms that are associated with the property term on the first level. Like in the first-level dataset illustrated in FIG. 1, FIG. 6A and FIG. 6B, each second-level property term can also have one or more columns of corresponding association strength values (1550). The relevance determination methods described above can be recursively applied to each level for more accurate results when such datasets are available.

In yet some other embodiments, the property terms of a dataset can be stored separately, not necessarily in a list or column or row format, but stored as data points in any format linked with the concept of topic name or description.

It should be understood that the above-described methods are not limited to the specific examples used. Applications of the presently disclosed system and methods are not limited to the above examples, either. Configurations and processes can vary without deviating from the spirit of the invention.

What is claimed is:

1. A method implemented on a computer comprising a processor, and for determining relevance between a text content and an object or a topic, the method comprising:

receiving a text content comprising one or more words or phrases or sentences as terms, and tokenizing the text content into one or more tokens, each being an instance of a term in the text content;

identifying a grammatical attribute, or a semantic attribute, or an external term frequency associated with the one or more tokens or terms in the text content, wherein the grammatical attribute includes at least a subject, a predicate or part of a predicate, a modifier in a phrase, a head of a phrase, a sub-phrase of a phrase, an object, a noun, a verb, an adjective, or an adverb, wherein the semantic attribute includes at least semantic roles and attribute values, wherein the external term frequency is obtained from text contents other than the received text content;

determining an importance measure for each token or term based on the grammatical attribute, or the semantic attribute, or the external term frequency;

receiving one or more datasets, wherein each dataset is associated with a name or description representing an object, wherein the object comprises a physical or conceptual object, a topic, or a pre-defined attribute, and wherein each dataset comprises one or more words or phrases as names of properties associated with the corresponding object, wherein the names of properties represent other objects or concepts or topics or attributes-related to the object, wherein the names of properties collectively represent a type of definition or representation of the object;

matching at least two tokens or terms in the text content with at least two property names in each of the one or more datasets;

for each of the one or more datasets, producing a score based at least on the importance measure of the token or term that matches a property name in the dataset, when the importance measure is in the form of a term importance score that is calculated based on the external frequency, or based on the grammatical attribute, or based on the semantic attribute or attribute value, and when the score based on the importance measure is in the form of a relevance score, the relevance score is produced as a function of the term importance score; and marking or selecting one or more of the names or descriptions representing the one or more objects as being relevant to the text content if the corresponding score is above a predefined threshold.

2. The method of claim 1, further comprising:

outputting, for storage or display, the one or more selected names or descriptions, or the score associated with the one or more marked or selected names or descriptions, wherein the function of the score includes at least serving as a quantitative measure of relevance between the text content and the object.

3. The method of claim 1, wherein a weighting co-efficient is assigned to each token based on the grammatical attribute or semantic attribute or attribute value associated with the token or term in the text content, wherein the relevance score is further produced as a function of at least the weighting co-efficient assigned to the token that matches a property name.

4. The method of claim 1, wherein a property name in each of the datasets has a corresponding numerical value representing the association strength between the property name and the object, wherein the score is produced further based on the association strength value associated with the matched property name.

5. The method of claim 1, wherein each property name in the dataset has a corresponding numerical value representing the association strength between the property name and the object, wherein the text content is a sentence comprising at least a first token and a second token, and the first token is associated with the grammatical role of a subject and the second token is associated with a grammatical role of at least part of a predicate; or wherein the text content is a multi-word phrase comprising at least a first token and a second token, and the first token is associated with the grammatical role of a head of the multi-word phrase and the second token is associated with a grammatical role of a modifier in the multi-word phrase, or the first token and the second token are associated with a grammatical role of a sub-phrase in the multi-word phrase; wherein the score is produced further based on the association strength value associated with the property name that matches the first token and the association strength value associated with the property name that matches the second token.

6. The method of claim 1, wherein a property name in each of the datasets has more than one corresponding numerical values representing the association strength between the property name and the object, each value representing the association strength under a specific context, wherein the step of producing the score is further based on the association strength value associated with the matched property name under a specific context, wherein the context includes at least the grammatical or semantic attribute of the matching tokens or terms.

7. The method of claim 1, wherein the property names in the datasets are divided into a plurality of groups, wherein the score is produced further based on the group or groups that comprise the property names matching the token.

8. The method of claim 1, wherein each property name in the dataset has a corresponding numerical value representing the association strength between the property name and the concept or topic or attribute, wherein the property names are divided into groups based on their association strength values being above or below a predetermined threshold, wherein the score is produced further based on the group or groups that comprise the property names matching the token.

9. The method of claim 1, wherein the one or more datasets are represented in the form of a table, each dataset representing one or more columns or rows in the table; or wherein the one or more datasets are represented in the form of an inverted index with each term in the index pointing to a corresponding object name with an optional corresponding numerical value, wherein the function of the numerical value includes representing the association strength or association status between the term and the object; or wherein the one or more datasets are represented in the form of a hierarchical structure with one or more property terms as first-level property terms each associated with one or more second-level property terms or with corresponding second-level association strength values; or wherein the one or more datasets are represented in the form of the one or more property terms being stored separately as data points linked with the object name or description.

10. The method of claim 1, wherein the one or more marked or selected names or descriptions represent one or more document categories, the method further comprising:

assigning the text content to the one or more document categories represented by the one or more marked or selected names or descriptions.

11. The method of claim 1, wherein the one or more selected names or descriptions represent the context of a word or phrase in the text content, wherein the word or phrase has a plurality of meanings or senses, the method further comprising:

selecting a meaning or sense from the plurality of meanings or senses as a relevant meaning or sense of the word or phrase to the context represented by the one or more marked or selected names or descriptions.

12. The method of claim 1, wherein the one or more marked or selected names or descriptions represent one or more topics or topic domains, the method further comprising:

outputting one or more of the marked or selected names or descriptions as one or more answers to a question about related topics or topic domains of the text content.

13. The method of claim 1, wherein the one or more marked or selected names or descriptions represent one or more topics or topic domains relevant for advertisements, the method further comprising:

indicating the one or more marked or selected names or descriptions for use with advertising, or displaying an advertisement in a user interface in connection with the text content, wherein the user interface includes a web user interface, a social network page, a chat screen, or an email interface, or as an audio message through an audio device, on a computing or communication device including a desktop or a notebook computer, a mobile or hand-held device, a cloud-based device, or a mobile or land phone.

14. The method of claim 1, wherein the text content is a word or a multi-word phrase, or a sentence or a paragraph or a document or a collection of a plurality of documents, wherein a document or a collection of a plurality of documents is any content containing text of a language, including a search query, a webpage, a blog, an email, an SMS message, a transcript from an audio or text conversation, a user comment or chat message entered on a website or on a social network page, or in a user interface of a computing or communication device, wherein the computing or communication device includes a desktop computer, a notebook computer, a mobile or hand-held device, a cloud-based device, or a mobile phone or a land phone.

15. A computer system for identifying one or more topics or topic domains or attributes related to a text content, comprising:

a computer processor operable to receive a text content comprising one or more words or phrases or sentences as terms, and to tokenize the text content into one or more tokens, each being an instance of a term in the text content;

identify a grammatical attribute, or a semantic attribute, or an external term frequency associated with the one or more tokens or terms in the text content, wherein the grammatical attribute includes at least a subject, a predicate or part of a predicate, a modifier in a phrase, a head of a phrase, a sub-phrase of a phrase, an object, a noun, a verb, an adjective, or an adverb, wherein the semantic attribute includes at least semantic roles and attribute values, wherein the external term frequency is obtained from text contents other than the received text content;

determine an importance measure for each token or term based on the grammatical attribute, or the semantic attribute, or the external term frequency;

receive one or more datasets, wherein each dataset is associated with a name or description representing an object, wherein the object comprises a physical object or a concept, a topic, a topic domain, or a pre-defined attribute, wherein each dataset comprises one or more words or phrases as names of properties associated with the corresponding object, wherein the names of properties represent other objects or concepts or topics or attributes related to the object, wherein the names of properties collectively represent a type of definition or representation of the object;

match at least two tokens or terms in the text content with at least two property names in each of the one or more datasets;

produce, for each of the one or more datasets, a score based at least on the importance measure of each token or term that matches a property name in the dataset, when the importance measure is in the form of a term importance score that is calculated based on the external frequency, or based on the grammatical attribute, or based on the semantic attribute or attribute value, and when the score based on the importance measure is in the form of a relevance score, the relevance score is produced as a function of the term importance score;

select one or more names or descriptions of the one or more datasets as relevant objects or topics or topic domains or attributes to the text content if the corresponding score is above a predefined threshold; and display, or provide an instruction to display in a user interface, or to store in the computer storage, the selected one or more names or descriptions, or the score associated with the one or more selected names or descriptions, wherein the function of the score includes serving as a quantitative measure of relevance between the text content and the selected one or more names or descriptions of the objects, or topics or topic domains or attributes.

16. The computer system of claim 15, wherein the text content is a search query, a webpage, a blog, an email, an SMS message, a transcript from an audio or text conversation, a user comment or chat message entered on a website or on a social network page, or in a user interface of a computing or communication device, wherein the selected topic or domain is relevant for advertisements, wherein the computer processor is further operable to:

display in a user interface, or provide an instruction to display, an advertisement in connection with the text content, wherein the user interface includes a web user interface, a social network page, a chat screen, or an email interface, or as an audio message through an audio device, on a computing or communication device including a desktop or a notebook computer, a mobile or hand-held device, a cloud-based device, or a mobile or land phone.

17. The computer system of claim 15, wherein the text content further comprises a first content and a second content, wherein the selected one or more objects or topics or domains or attributes are relevant to both the first and the second content, wherein the first content or the second content includes a resume or a job description, wherein the computer processor is further operable to:

display or store, or provide an instruction to display or store, the first content as a relevant content to the second content, or the second content as a relevant content to the first content.

18. The computer system of claim 15, wherein the text content is a document with text, wherein the selected one or more names or descriptions represent one or more document categories or classes including at least the class or category of spam or junk email and non-spam email, wherein the computer processor is further operable to:

classify or categorize the document into the one or more classes or categories.

19. A computer system for searching documents and ranking search results based on association, comprising:

a computer storage storing one or more datasets, each dataset having a name or description representing an object, wherein the object comprises a physical object or a topic or concept, and each dataset comprises one or more words or phrases as names of properties associated with the corresponding named object, wherein the names of properties represent other objects or concepts or topics or attributes related to the object, wherein the names of properties collectively represent a type of definition or representation of the object; and a computer processor operable to receive a search query, receive one or more documents each comprising one or more words or phrases or sentences as terms, tokenize each of the documents into one or more tokens, each being an instance of a term in the text content, identify a grammatical attribute, or a semantic attribute, or an external term frequency associated with the one or more tokens or terms in the text content, wherein the grammatical attribute includes at least a subject, a predicate or part of a predicate, a modifier in a phrase, a head of a phrase, a sub-phrase of a phrase, an object, a noun, a verb, an adjective, or an adverb, wherein the semantic attribute includes at least semantic roles and attribute values, wherein the external term frequency is obtained from text contents other than the received documents, determine an importance measure for each token or term based on the grammatical attribute, or the semantic attribute, or the external term frequency, receive one or more names or descriptions of the datasets, wherein the one or more names or descriptions match a word or phrase in the query, obtain one or more of the corresponding datasets, for at least one of the documents, match at least two tokens or terms in the document with at least two property names in at least one of the one or more datasets, for at least one of the one or more datasets or documents, produce a relevance score based at least on the importance measure of the token or term that matches a property name in the dataset, when the importance measure is in the form of a term importance score that is calculated based on the external frequency, or based on the grammatical attribute, or based on the semantic attribute or attribute value, the relevance score is produced as a function of the term importance score, select one or more of the documents as relevant documents to the query and rank the selected documents based at least on the relevance score, and output the ranked documents or document representations as a search result.

* * * * *